United States Patent
Wettstein et al.

(10) Patent No.: US 10,958,678 B2
(45) Date of Patent: *Mar. 23, 2021

(54) IDENTITY BASED BEHAVIOR MEASUREMENT ARCHITECTURE

(71) Applicant: IDfusion, LLC, Fargo, ND (US)

(72) Inventors: Gregory Henry Wettstein, Fargo, ND (US); Scott Byron Stofferahn, Fargo, ND (US); Richard William Engen, Fargo, ND (US); Johannes Christian Grosen, Maple Grove, MN (US)

(73) Assignee: IDFUSION, LLC, Fargo, ND (US)

( * ) Notice: Subject to any disclaimer, the term of this patent is extended or adjusted under 35 U.S.C. 154(b) by 116 days.

This patent is subject to a terminal disclaimer.

(21) Appl. No.: 16/434,994

(22) Filed: Jun. 7, 2019

(65) Prior Publication Data

US 2019/0312902 A1 Oct. 10, 2019

Related U.S. Application Data

(63) Continuation of application No. 15/480,985, filed on Apr. 6, 2017, now Pat. No. 10,356,116.

(Continued)

(51) Int. Cl.
*H04L 29/06* (2006.01)
*G06F 21/57* (2013.01)
(Continued)

(52) U.S. Cl.
CPC .......... *H04L 63/1425* (2013.01); *G06F 21/57* (2013.01); *G06F 21/572* (2013.01);
(Continued)

(58) Field of Classification Search
CPC ... H04L 63/1425; H04L 9/085; H04L 9/0877; H04L 9/0897; H04L 9/3234;
(Continued)

(56) References Cited

U.S. PATENT DOCUMENTS 6,102,960 A 8/2000 Berman et al.
6,505,342 B1 * 1/2003 Hartmann ........... G06F 11/3688
714/E11.208

(Continued)

OTHER PUBLICATIONS

Bernstein, Curve25519: New Diffie-Hellman Speed Records, 22 pages, 2006.

(Continued)

*Primary Examiner* — Ghodrat Jamshidi
(74) *Attorney, Agent, or Firm* — Theodore M. Magee; Westman, Champlin & Koehler, P.A.

(57) ABSTRACT

A method includes generating a behavioral state for an endpoint device based on actor identities and corresponding subject identities for a plurality of operations wherein for each operation, a respective actor represented by a respective actor identity performs the operation upon a respective subject represented by a respective subject identity. Performance of a later operation by an actor with an actor identity upon a subject with a subject identity is recorded and the actor identity and the subject identity are used to determine that the performance of the later operation does not match the behavioral state and indicates a security risk.

16 Claims, 10 Drawing Sheets

Related U.S. Application Data

(60) Provisional application No. 62/319,517, filed on Apr. 7, 2016.

(51) Int. Cl.
  *G06F 21/72* (2013.01)
  *H04L 9/08* (2006.01)
  *H04L 9/32* (2006.01)
  *H04W 12/10* (2021.01)

(52) U.S. Cl.
  CPC .............. *G06F 21/72* (2013.01); *H04L 9/085* (2013.01); *H04L 9/0877* (2013.01); *H04L 9/0897* (2013.01); *H04L 9/3234* (2013.01); *H04L 9/3239* (2013.01); *H04L 63/0823* (2013.01); *H04L 63/12* (2013.01); *H04W 12/1006* (2019.01); *H04W 12/1008* (2019.01); *G06F 21/575* (2013.01); *H04L 2209/127* (2013.01)

(58) Field of Classification Search
  CPC ... H04L 9/3239; H04L 63/0823; H04L 63/12; H04L 2209/127; G06F 21/57; G06F 21/572; G06F 21/72; G06F 21/575; H04W 12/10
  See application file for complete search history.

(56) References Cited

U.S. PATENT DOCUMENTS

| | | | |
|---|---|---|---|
| 7,325,143 | B2 | 1/2008 | Wettstein |
| 8,627,414 | B1 | 1/2014 | McCune et al. |
| 8,677,115 | B2* | 3/2014 | Paris ...................... H04L 63/08 713/155 |
| 9,124,640 | B2 | 9/2015 | Sweet et al. |
| 9,147,277 | B2* | 9/2015 | Lanciault ................ G06T 13/00 |
| 9,304,998 | B2 | 4/2016 | Diaconu et al. |
| 9,306,748 | B2* | 4/2016 | Baek ...................... H04L 9/321 |
| 9,924,366 | B2* | 3/2018 | Schmidt ............ H04W 12/0023 |
| 2009/0235324 | A1* | 9/2009 | Griffin .................... G06F 21/55 726/1 |
| 2012/0036553 | A1* | 2/2012 | Xiao ....................... G06F 21/57 726/1 |
| 2014/0215202 | A1 | 7/2014 | Paris et al. |
| 2014/0230012 | A1* | 8/2014 | Ahn ......................... G06F 21/57 726/1 |
| 2015/0052616 | A1 | 2/2015 | Hutchison et al. |
| 2015/0161386 | A1 | 6/2015 | Gupta et al. |
| 2015/0264077 | A1* | 9/2015 | Berger ................ H04L 63/1441 726/23 |
| 2016/0171494 | A1 | 6/2016 | Jiang et al. |
| 2017/0006063 | A1 | 1/2017 | Sundaram |
| 2017/0295195 | A1 | 10/2017 | Wettstein et al. |
| 2018/0068098 | A1* | 3/2018 | Finzi ...................... H04L 9/321 |

OTHER PUBLICATIONS

Communication dated 11/14/18 for corresponding European Application No. 17718689.7.
Iso/iec: "ISO/IEC 11889-1:2015(E)—Trusted Platform Module Library—Part 1: Architecture (Corrected version from Jan. 4, 2016", Switzerland, Apr. 1, 2016, pp. 1-278, Retrieved from the Internet: https://www.iso.org/standard/66510.html.
Jacquin et al., "Towards trusted software-defined networks using a hardware-based Integrity Measurement Architecture", Proceedings of the 2015 1st IEEE Conference on Network Softwarization (Netsoft), IEEE, Apr. 13, 2015, pp. 1-6.
PCT International Search Report and Written Opinion dated Jul. 6, 2017 for PCT Application Serial No. PCT/US2017/026399.
Sailer et al., Design and Implementation of a TCG-Based Integrity Measurement Architecture, IBM, Thomas J. Watson Research Center, Usenix Security Symposium, 16 pages, 2004.
Trusted Computing Group, TCG Infrastructure Working Group Integrity Report Schema Specification, 41 pages, 2006.
CA cert.org Possum Project, Possum—CAcert Wiki, 4 pages, 2014.
Prosecution history of corresponding U.S. Appl. No. 15/480,985 including: Notice of Allowance dated Mar. 7, 2019; Examiner Interview Summary dated Mar. 7, 2019; Applicant Initiated Interview Summary dated Jan. 2, 2019; Amendment dated Dec. 26, 2018; Office Action dated Sep. 26, 2018.
Communication pursuant to Article 94(3) EPC dated Dec. 2, 2019 for corresponding European Application Serial No. 17718689.7.

* cited by examiner

IDENTITY BASED BEHAVIOR MEASUREMENT ARCHITECTURE

CROSS-REFERENCE TO RELATED APPLICATION

The present application is a continuation of and claims priority of U.S. patent application Ser. No. 15/480,985, filed Apr. 6, 2017, the content of which is hereby incorporated by reference in its entirety, and which is based on and claims the benefit of U.S. provisional patent application Ser. No. 62/319,517, filed Apr. 7, 2016, the content of which is hereby incorporated by reference in its entirety.

FIELD

Described herein are systems related to identity based behavior measurement of computer operating systems and corresponding devices, such as systems using an Integrity Measurement Architecture (IMA).

BACKGROUND

Global networking has produced a system of unparalleled value to modern society. Extracting value from this system of information exchange is based on the ability to implement intelligent endpoint nodes on the network consisting of systems ranging in size from supercomputers through wearable systems. The premise of the Internet-Of-Things, popularized as IOT, suggests this trend should continue.

Unfortunately, this proliferation of intelligent endpoints has created an environment unparalleled in the history of information security and risk management. Each endpoint represents a potential failure point with respect to the desired system behavior being subverted to the goals of an aggressor seeking to capture privileged information or disrupt the intended functionality of the endpoint. The global network which synergizes the utility of these endpoints also provides the framework for launching attacks against the endpoints from anywhere in the world, with the added complication of little or no possibility for attributing the origin of the attack.

Since the inception of global networking, the security strategy has been to protect intelligent endpoints by sequestering them from access by the network at large using firewall technology. Simple firewalls have given way to stateful firewalls and intrusion detection and prevention systems which seek to recognize and optionally interdict attempts to subvert the functionality of the protected systems. The effect of these systems has been to produce architectures which are effectively soft targets once the perimeter protection systems have been breached.

To maximize the effect of a compromised system, the focus by malicious actors has been on the development of advanced persistent threat (APT) technologies which seek to introduce long term behavioral modifications to the endpoint targets. This provides a mechanism which persists the ability to exfiltrate information from the compromised systems long past the initial breach. This strategy is particularly effective in the firewall model since it allows other 'soft' targets in the interior of the protection domain to be attacked and infiltrated without interdiction by the perimeter defense systems.

The response has been to employ additional protection systems to monitor internal network traffic to interpret whether illicit behavior is being demonstrated by any internal network endpoints. However, if aggressors avoid detection by perimeter systems it is likely that internal network monitoring should also fail. Any type of traffic monitoring also faces challenges associated with steganographic methods which shroud illicit traffic in ever increasing quantities of legitimate traffic.

Furthermore, an industry movement toward the use of strong encryption may lead to increasingly random data streams which can be used to camouflage illicit network traffic. Major system compromises in recent years in the federal government, entertainment, retail and healthcare industries have demonstrated the ability of attackers to persist information exfiltration attacks for long periods of time without detection. In these attacks, aggressors have exported hundreds of gigabytes of data without being detected by internal or perimeter defense systems.

Maintaining the security of network endpoints has classically involved continually applying updates to security vulnerabilities in operating systems and application platforms. This strategy can be unreliable in the face of zero-day exploits which leverage previously undiscovered software vulnerabilities to implement both the initial compromise and subsequent persistence of attack systems.

Also, with more sophisticated security systems, a primary threat to effective security is the economics of information technology. Vendors seek to appease markets that demand platforms which implement the value proposition of ubiquitous networking but which do not reward attention to the security implications of such systems. Addressing the modern information security challenge demands attention to the economics of security which can benefit from cost and complexity minimization on network endpoints. It has been doctrine in the security industry that security and complexity are mutually incompatible. The recent attention to containerization strategies is an attempt to reduce the complexity and attack surface of service providing endpoints. While such systems provide isolation, they do not provide a system for determining whether the behavior of the encapsulated system is consistent with the intent of the system.

SUMMARY

A Behavior Measurement Architecture (BMA) and related technologies are described herein. The BMA can be derived from an Integrity Measurement Architecture (IMA) and use an identity model to express a deterministic measurement value for platform behavior.

In some exemplary embodiments, a system stored on a non-transitory computer readable medium can include instructions for the BMA. The instructions can be executable to use an identity model to express a deterministic measurement value representative of behavior of an endpoint device of a group of service-providing network endpoints or a platform of the group of service-providing network endpoints hosted on the endpoint device.

The system can also include instructions for a security supervisor provided by the BMA and implemented through a daemon or an operating system program. The instructions for the security supervisor can be executable to generate the unique identity for the endpoint device based on the identity model including a hash function. The deterministic value includes the unique identity for the endpoint device.

The instructions for the security supervisor can also be executable to verify behavior of the endpoint device or the platform using the unique identity. The instructions can also be executable to uphold a pre-defined behavioral state of the endpoint device or the platform and support the execution of the application instructions stored in the memory of the endpoint device using the unique identity. The instructions can also be executable to execute a pre-determined action, via itself or a device derived from the security supervisor, if a behavior of the endpoint device or the platform is inconsistent with the pre-defined behavioral state of the endpoint device or the platform, according the unique identity of the endpoint device.

In some exemplary embodiments, the BMA can be based on three premises. The first premise provides that the system behavior identity of an actor process is expressed by the functional projection of the identity factors of the process over the identity factors of an acted upon subject identity. The second premise provides that functional projections of first premise represent a mutually exclusive and collectively exhaustive set of contours which represent a set of values derived from the total number of unique actors and the total number of unique subjects of the system. The third premise provides that neglecting inter-contour and extra-contour time dependencies, a single deterministic measurement of the platform behavior is given by an extension hash sum of an arbitrary ordering of the contour points from the second premise. For example, each point can be projected into a range selected according to the device identity.

BRIEF DESCRIPTION OF THE DRAWINGS

The systems and methods may be better understood with reference to the following drawings and description. Non-limiting and non-exhaustive examples are described with reference to the following drawings. The components in the drawings are not necessarily to scale; emphasis instead is being placed upon illustrating the principles of the system. In the drawings, like referenced numerals designate corresponding parts throughout the different views.

DETAILED DESCRIPTION

Figure 1:
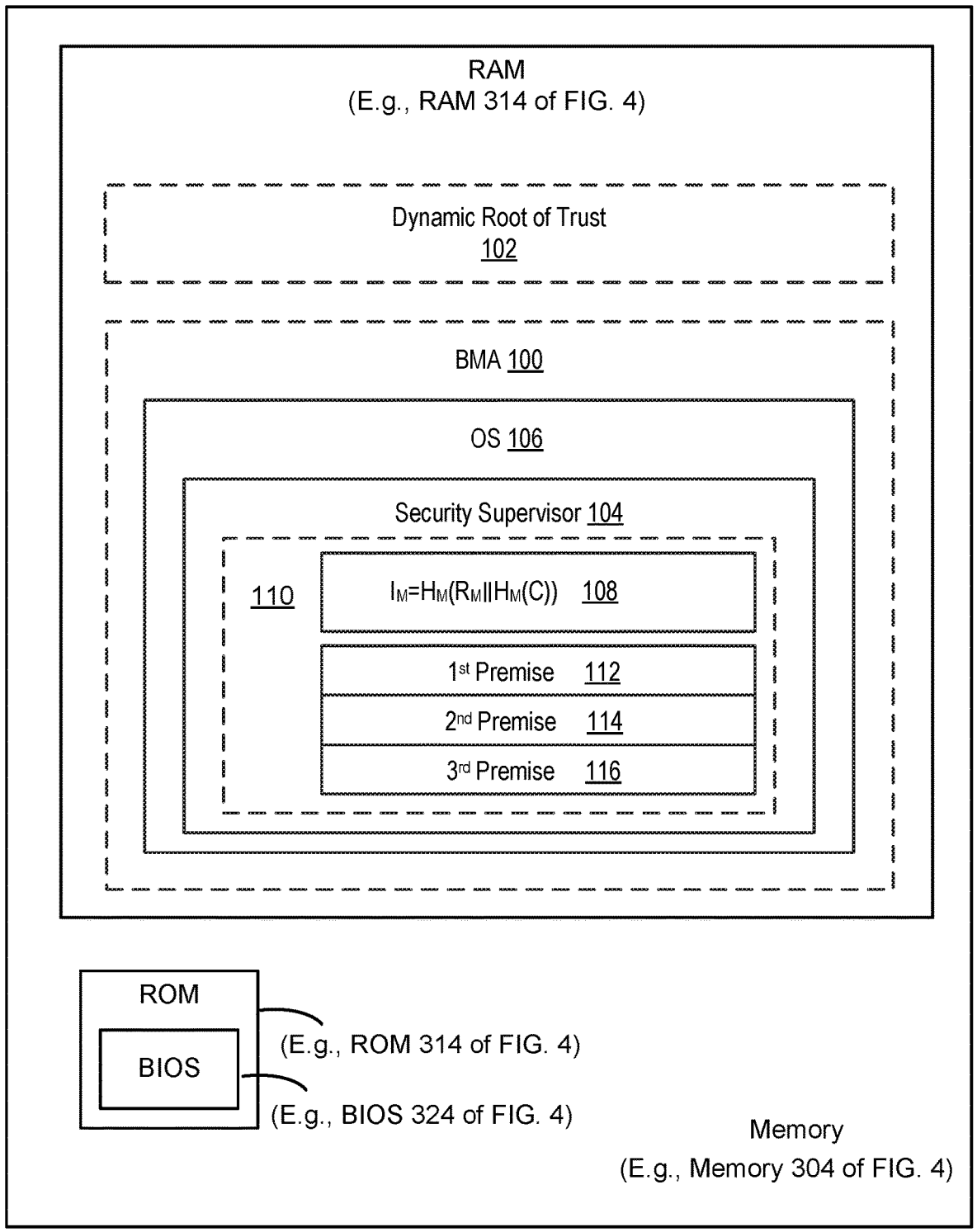
FIG. 1 illustrates a block diagram of the example device that can implement a behavior measurement architecture (BMA) in combination with a dynamic root of trust.

Embodiments of the invention are described more fully hereinafter with reference to the accompanying drawings. Elements that are identified using the same or similar reference characters refer to the same or similar elements. The various embodiments of the invention may, however, be embodied in many different forms and should not be construed as limited to the embodiments set forth herein. Rather, these embodiments are provided so that this disclosure will be thorough and complete, and will fully convey the scope of the invention to those skilled in the art.

Specific details are given in the following description to provide a thorough understanding of the embodiments. However, it is understood by those of ordinary skill in the art that the embodiments may be practiced without these specific details. For example, circuits, systems, networks, processes, frames, supports, connectors, motors, processors, and other components may not be shown, or shown in block diagram form to not obscure the embodiments in unnecessary detail.

The terminology used herein is for describing embodiments only and is not intended to be limiting of the invention. As used herein, the singular forms "a", "an" and "the" are intended to include the plural forms as well, unless the context clearly indicates otherwise. It will be further understood that the terms "includes", "including", "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element is referred to as being "connected" or "coupled" to another element, it can be directly connected or coupled to the other element or intervening elements may be present. In contrast, if an element is referred to as being "directly connected" or "directly coupled" to another element, there are no intervening elements present.

It will be understood that, although the terms first, second, etc. may be used herein to describe various elements, these elements should not be limited by these terms. These terms are only used to distinguish one element from another. Thus, a first element could be termed a second element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Introduction

The identity based behavior measurement architecture described herein addresses at least the issues and security challenges described in the Background section. A security supervisor associated with the BMA can implement verification of behavior of service-providing network endpoints or a platform of the endpoints. Each of the endpoints include at least a processor such as a central processing unit (CPU). Such endpoints may include devices with a standard operating system, such as LINUX or WINDOWS. The system can handle the plethora of network endpoints which contain privileged information and/or which may be used to harbor malicious software. An endpoint may include a desktop or laptop computer, a mobile device or any type of smart device (e.g., smart phone, tablet computer, smartwatch, smart TV, smart appliance), any type of computer operating a firewall, network equipment such as a router, a point of sale device or system, digital signage, an information exchange or transport system, a control system such as an industrial control system, a data acquisition system, a cloud microservice, a navigation system, and an autonomous car system, just to list a handful.

The security supervisor can implement and maintain the system in a pre-defined behavioral state and support the execution of applications needed to achieve desired services of the endpoint. In an exemplary embodiment, the endpoint can verify its functionality on a measurement of the desired functional behavior of the platform running on the device. Optionally, for example, the supervisor can take a predetermined action on the detection of undesired behavior such as issuing an alert indication, halting the system (a "kill switch") or resetting the system to a known state.

In an exemplary embodiment, the security supervisor can be implemented to address the security needs of devices which are managing information which have no ex-post-facto redress for information disclosure. These environments are defined as situations which lack a reversibility path for information disclosure or system compromise. Examples of such environments include: privileged healthcare information systems, personally sensitive information system, and systems guarding the safekeeping of people and life. These are distinct from payment systems and other reversible or partially reversible systems. For instance, systems holding credit card information may be reversible through financial remuneration. In privileged information systems or critical systems, since the disclosure of information cannot be unlearned a breach of such systems' security can be catastrophic. For example, in the case of healthcare, knowledge regarding potentially sensitive information such as genetic predisposition to disease, may threaten an individual's future employment or cost of insurance. Also, for example, in instances of mission critical systems, such as automotive and flight control systems, a breach could threaten the safety and lives of people. Clearly breaches of such systems are irreversible processes.

Furthermore, the catastrophic nature of securing such systems, creates a need for insurance processes to intervene and serve as a governing influence. To meet such a possible driving force in the market, an exemplary embodiment of the security supervisor can provide quantifiable guarantees or behavior attestations for parties evaluating the integrity of an insured system.

Identity Model

FIG. 1 illustrates a block diagram of the example device that can implement a behavior measurement architecture (BMA) 100 in combination with a dynamic root of trust 102. This combination offers the means to implement systems which support system compromise detection. In some exemplary embodiments, the system is also based on and uses a security supervisor derived from an identity-attestation architecture, such as shown in FIG. 1. In one exemplary embodiment illustrated in FIG. 1, the system includes a BMA 100 coupled to a dynamic root of trust 102 that provides a reference to a behavior-based identity state of the platform or an endpoint hosting the platform. The BMA 100 can detect compromised platform behavior and provide a security supervisor 104 based on the BMA 100. The security supervisor 104 is implemented through a daemon and/or an operating system program 106. In one example, a security supervisor of the BMA can be implemented through a LINUX kernel.

As mentioned, in some exemplary embodiments, the security supervisor can be based on an identity-attestation architecture. This model assumes each device can have a unique identity assigned to it, such as by a provisioning organization. The attestable measurement value of the platform is a manifestation of the intrinsic identity assigned to a device. Such an architecture is based on the generation of an N-bit number used to represent an identity. The identity is generated by applying a cryptographic hash function over two components, a range selector and a credential. As shown in FIG. 1, the security supervisor 104 includes executable instructions 108 stored in memory to generate a unique identity for a device under the BMA 100. This is formalized by the following description or extension operator: $I_M = H_M(R_M \| H_M(C))$, where $I_M$ is the identity, $R_M$ is the range value of size M, C is the credential, $\|$ is a concatenation, and $H_M$ is a hash function with digest size M.

The $R_M$ value serves to select the possible range of functional values which can be achieved by any given credential mapping. Absent knowledge of the range selector, the actual credential used to formulate the identity is protected from disclosure by the infeasibility of determining the 2*M sized function pre-image. An organization provisioning devices has a top-level identity defined by some credential value such as a tax identification number. Once the organizational identity is generated, it can serve as the $R_M$ value for subordinate identities within the context of the organization. The subordinate identity space is logically defined into three separate groupings: users, services, and devices. An example representation of this identity space may be described as an irreversibly directed acyclic multitree.

In such examples, the device identity can be derived by applying the basic identity expression in the following form: $D_M = H_M(O_M \| H_M(D_C))$, where $D_M$ is the device identity, $O_M$ is the organization's identity, $D_C$ is the device's credential, $\|$ is a concatenation, and $H_M$ is a hash function with digest size M. In these examples, SHA256 can be used for $H_M$ which yields the device identity as a 256-bit injective mapping into a range selected by the organizational identity.

The security supervisor in some embodiments can a functional expression of the identity. This is a three-component expression which implements the following three elemental functions of an identity: identity assertion, identity implementation, and identity authentication. The identity assertion can be a 512-bit representation of the identity which allows the device to indicate it is in possession of an implementation of the identity which can be represented as a 2048-bit number. The identity authentication element can be a 256-bit number used to authenticate the assertion and implementation of the identity. An ASCII representation of the functional expression of the identity can be used for tooling and expression needs. The following is an example format that can be used.

```
-----BEGIN IDENTITY TOKEN-----
-----BEGIN ASSERTION-----
feedbeef
-----END ASSERTION-----
-----BEGIN IMPLEMENTATION-----
feedbeef
-----END IMPLEMENTATION-----
-----BEGIN AUTHENTICATION-----
feedbeef
-----END AUTHENTICATION-----
-----END IDENTITY TOKEN-----
```

An ASN.1 representation of the identity may be used internally in the supervisor.

Behavior Measurement Architecture

In an exemplary embodiment, such as shown in FIG. 1, the security supervisor 104 can use an identity model 110 such as the native Integrity Measurement Architecture (IMA) or a modified version of IMA. The native IMA was originally implemented in a LINUX kernel by the IBM Trusted Computing Group. Further, in such an embodiment, the BMA can include a modified version of IMA.

The BMA 100 can use the identity model 110 (which is based on processor executable instructions stored in memory) to express a deterministic measurement value for platform behavior. In some exemplary embodiments, the modifications of the BMA 100 are based on three premises. Each of the three premises is based on processor executable instructions stored in memory. Also, besides these last-mentioned instructions, any of the instructions described herein may be configured to be executable by a processor such as the CPU 302.

The instructions for the first premise 112 provide that the system behavior identity of an actor process is expressed by the functional projection of the identity factors of the process over the identity factors of an acted upon subject identity.

The instructions for the second premise 114 provide that functional projections of first premise represent a mutually exclusive and collectively exhaustive set of contours which represent an actor and subject set of values, such as an A*S set of values. The values define the fundamental behaviors of the platform. 'A' represents the total number of unique actors and 'S' represents the total number of unique subjects.

The instructions for the third premise 116 provide that, neglecting inter-contour and extra-contour time dependencies, a single deterministic measurement of the platform behavior is given by the extension hash sum of an arbitrary ordering of the contour points from the second premise. Each contour is projected into a range selected by the device identity.

The identity model conceptually is analogous to ideas of quantum molecular orbital theory. Each actor identity can be thought of as precessing through an orbit defined by its interaction with a field of subject identities. Each of the contours represents the authorized behaviors of an actor identity. The sum of all the contours (which can be thought of as a sum of all behavioral orbits) represents a bounded measurement of the gross platform behavior. This is analogous to the notion of the energy of a molecular system being modeled as a linear combination of all the atomic orbitals used to describe the atoms in a molecule.

The third premise reflects the notion of the gross measurement of system behavior as the sum of the behaviors of the individual actor identities. The important model simplification of time invariance is inherent in this premise. Intra-contour time independence implies the notion of neglecting the order in which actor identities interact with subject identities. Inter-contour time independence implies the notion of neglecting any dependency in the ordering of the actions of different actor identities.

Accepting the simplification of time independence implies that such a system is (A*S)−1 degenerate. As an example, a system with two actor identities and two subject identities yields four behavior measurements, any combination of which reflects the deterministic system behavior value. This is once again analogous to molecular orbital theory where multiple molecular wave functions can yield the same molecular energy value.

The notion of degenerate representations of a single system behavior measurement has implications with respect to both system management and the functional integrity of the gross system measurement. The acceptance of time independence implies the security supervisor can load the set of contours at system initialization time. A system reference quote taken at the aforesaid time reflects the behavioral measurement of the system over its functional lifetime. Any additional actor/subject contour projections result in a perturbation of the system behavior measurement which is a detectable event. Upon or after detection of the perturbation, the security supervisor may take a pre-specified action to protect the system.

From a security perspective, the simplification of time invariance implies an acceptance of some loss in fidelity of the gross system measurement representing the system behavior. Examples would be a situation where the integrity of the system is based on either the order in which an actor acts on specific subjects or the order in which separate actors operate. Increasing the precision of the gross system measurement includes a reduction in the degeneracy level of the measurement model. This includes ordering of the contour points so they are representative of the actor/subject trajectory path in the system being modeled. This can be accomplished either in-situ when a measured system environment is designed, or by capturing the contour points at some point in the system initialization process or a combination of both procedures.

The factors used to compose the identities in a measured system must exhibit closure over the system being measured. An example of this issue is in designing attested systems which interact with other attested systems. A cyclic dependency is inherent in attempting to include the measurement state of the counter-party system as a subject identity factor secondary to that system depending, in turn, on the measurement status of the system being constructed. A strategy for addressing this issue and the challenge of writable files is discussed in the Exemplary BMA Implementation section.

Referring to the first premise, the actor identity is given by: $A_M = H_M (F_1 \ldots F_N)$, where $A_M$ is an actor identity, F is the actor identity dimensions, $H_M$ is a hash function with a digest size M. The dimensions used to create the actor identity are selected to reflect properties which are important in regulating the actions of the actor over its subject field. Example dimensions can include discretionary access control values, mandatory access control labels and security capabilities.

The subject identity is given by: $S_M = H_M (F_1 \ldots F_N)$, where $S_M$ is a subject identity, F is the subject identity dimensions, $H_M$ is a hash function with digest size M. The dimensions used to create the subject identity may reflect the characteristic properties of the identity, such as filename, cryptographic sum of file contents, file inode number, filesystem universally unique identifier (UUID), discretionary access control values and mandatory access control labels. An implementation may include a subject which is an operating system representation of a remote network connection. In such an implementation, the characteristic properties may include parameters such as the address and port number of the remote host.

The contour projection point for a given actor identity operating on a subject identity is given by the following: $C_M = H_M (A_M \| S_M)$, where $C_M$ is the contour point, $A_M$ the actor identity, $S_M$ is the subject identity, $\|$ is a concatenation, $H_M$ is a hash function with a digest size M. The $C_M$ identity is the generic projection of the actor/subject identity interaction and can be calculated in-situ by the system designer given a knowledge of the identity factors used to represent the actor and subject. According to the third premise, this point is projected into a device specific identity through the following function: $P_M = H_M (D_M \| C_M)$, where $D_M$ is the device identity, $C_M$ is the contour point, $\|$ is a concatenation, $H_M$ is a hash function with digest size M. The $P_M$ identity projection allows the measurement contours to be prepared as part of the system image without security concerns over their content. The final platform measurement is protected by managing the security of the device identity.

Some Exemplary BMA Implementations

Figure 2:
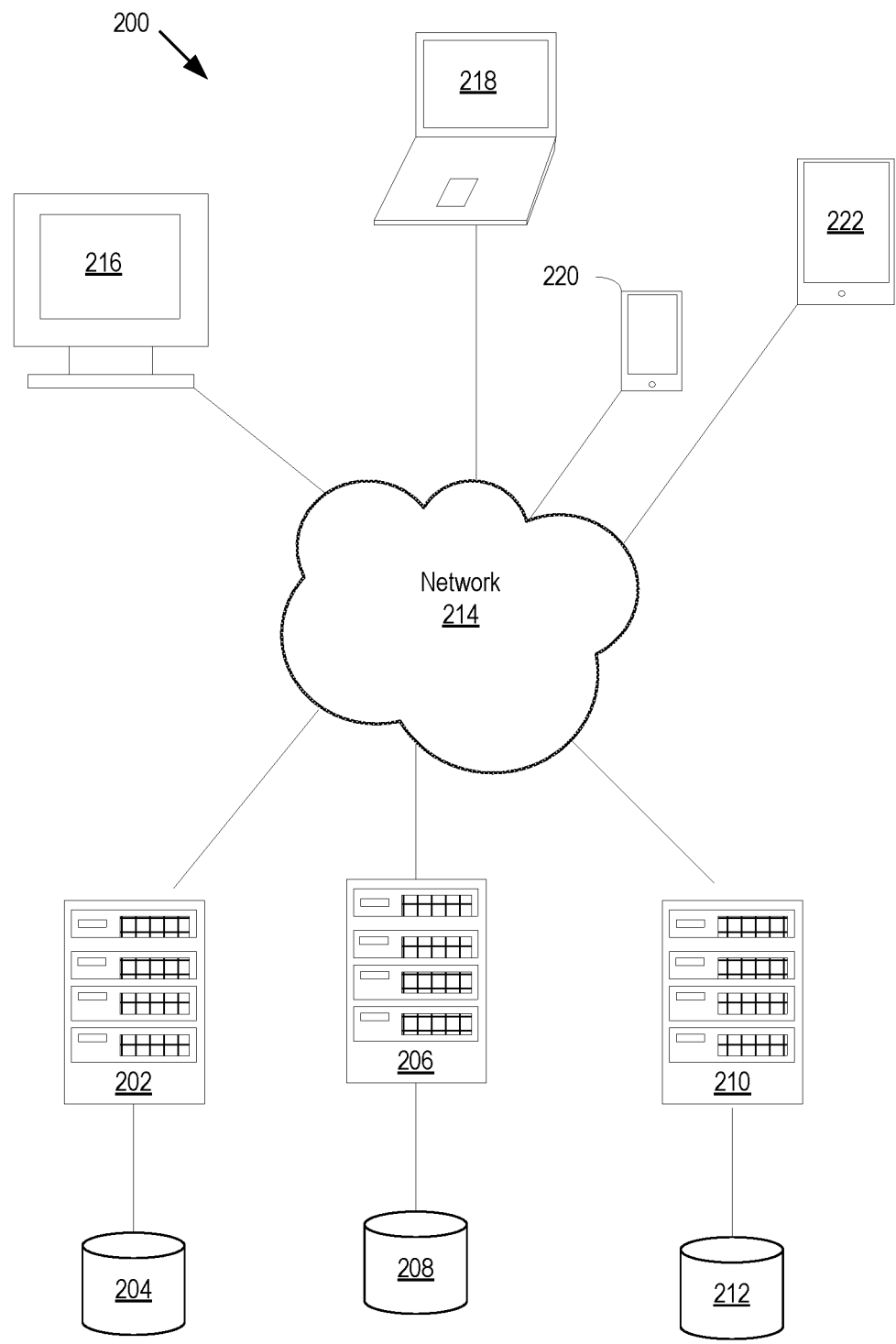
FIG. 2 illustrates a block diagram of an example information system that includes example devices configured to use the BMA.

FIG. 2 illustrates a block diagram of an example information system 200 that includes example devices configured to use the BMA. The information system 200 in the example of FIG. 2 includes first service server 202, first service database 204, second service server 206, second service database 208, third service server 210, and third service database 212. The servers and databases can be communicatively coupled over a network 214. The network 214 may be a computer network. The servers may each be one or more server computers.

The information system 200 may be accessible over the network 214 by user devices, which may include desktop computers (such as device 216), laptop computers (such as device 218), smartphones (such as device 220), and tablet computers (such as device 222). In various examples of such an online information system, users may search for and obtain content from sources over the network 214, such as obtaining content from a search engine server, a content server, or any other type of server providing a service over the network (such as the first, second, and third service servers depicted in FIG. 2).

In an example, the first service server 202 can stores account information of users. The first service server 202 is in data communication with the first service database 204. Account information may include database records associated with respective users. Suitable information may be stored, maintained, updated and read from the first service database 204 by the first service server 202. Examples include user identification information, user security information, such as passwords and any of the security credentials described herein, account balance information, and information related to content associated with user's preferred content items, and user interactions associated with user's preferred content items and associated content. The account information may also include demographic or psychographic information associated with the user.

The first service server 202 (as well as the second and third service servers depicted in FIG. 2) may be implemented using a suitable device. Each of the service servers may be implemented as a single server, a plurality of servers, or another type of computing device known in the art. Access to the service servers can be accomplished through a firewall that protects the account management programs and the account information from external tampering. Additional security may be provided via enhancements to the standard communications protocols, such as Secure HTTP (HTTPS) or the Secure Sockets Layer (SSL). Such security may be applied to any of the servers of FIG. 2, for example. Furthermore, the behavior measurement architecture and the security supervisor described herein may be implemented on any one or more of the service servers depicted in FIG. 2.

The first service server 202 (as well as the second and third service servers depicted in FIG. 2) each may provide a user configuration front end to simplify the process of accessing the account information of the user. The user configuration front end may be a program, application, or software routine that forms a graphical user interface. In an example, the user configuration front end is accessible as a webpage. The webpage can provide fields for selecting preferences, such as content preferences of the user. Content preferences and other user configurable information may be changed and viewed when the user is logged on to the system. User preferences and other configuration information may be saved to each service server's respective database.

The servers and databases may be implemented through a computing device. A computing device can send and receive signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include a central processing unit and memory. A server may also include a mass storage device, a power supply, wired and wireless network interfaces, input/output interfaces, and/or an operating system, such as WINDOWS SERVER, MAC OS X, UNIX, LINUX, FREE BSD, or the like.

Further, the servers and databases may be implemented as online server systems or may be in communication with online server systems. An online server system may include a device that includes a configuration to provide data via a network to another device including in response to received requests for page views or other forms of content delivery. An online server system may, for example, host a site, such as a social networking site, examples of which may include Flicker, Twitter, Facebook, LinkedIn, or a personal user site (such as a blog, vlog, online dating site, etc.). An online server system may also host a variety of other sites, including business sites, educational sites, dictionary sites, encyclopedia sites, wikis, financial sites, government sites, etc.

An online server system may further provide a variety of services that may include web services, third-party services, audio services, video services, email services, instant messaging (IM) services, SMS services, MMS services, FTP services, voice over IP (VOIP) services, calendaring services, photo services, or the like. Examples of content may include text, images, audio, video, or the like, which may be processed in the form of physical signals, such as electrical signals, for example, or may be stored in memory, as physical states, for example. Examples of devices that may operate as an online server system include desktop computers, multiprocessor systems, microprocessor-type or programmable consumer electronics, etc. The online server system may or may not be under common ownership or control with the servers and databases described herein.

The network 214 may include a data communication network or a combination of networks. A network may couple devices so that communications may be exchanged, such as between a server and a client device or other types of devices, including between wireless devices coupled via a wireless network, for example. A network may also include mass storage, such as a network attached storage (NAS), a storage area network (SAN), or other forms of computer or machine readable media, for example. A network may include the Internet, local area networks (LANs), wide area networks (WANs), wire-line type connections, wireless type connections, or any combination thereof. Likewise, sub-networks, such as may employ differing architectures or may be compliant or compatible with differing protocols, may interoperate within a larger network, such as the network 214.

Various types of devices may be made available to provide an interoperable capability for differing architectures or protocols. For example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links, including satellite links, or other communication links or channels, such as may be known to those skilled in the art. Furthermore, a computing device or other related electronic devices may be remotely coupled to a network, such as via a telephone line or link, for example.

A user device, which may be any one of the devices 216-222 or endpoints described herein, includes a data processing device that may access the information system 200 over the network 214. A user device is operative to interact over the network 214 with any of the servers or databases described herein. The user device may implement a client-side application for rendering front end graphical user interfaces. Through such front ends electronic properties and application data may be viewed and corresponding requests may be received and submitted to any one the service servers depicted in FIG. 2. A user device may communicate data to the information system 200, including data defining electronic properties and interactions with content. A user device may receive communications from the information system 200, including data associated with services of the servers depicted in FIG. 2. The interactions and information described herein may be logged in data logs, and such logs may be analyzed and monetized, as well as secured by one or more of the encryption and decryption techniques described herein.

A user device and a content provider device may operate as a client device when accessing information on the information system 200. A client device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like. A client device may vary in terms of capabilities or features. Claimed subject matter is intended to cover a wide range of potential variations. For example, a cell phone may include a numeric keypad or a display of limited functionality, such as a monochrome liquid crystal display (LCD) for displaying text. In another example, a web-enabled client device may include a physical or virtual keyboard, mass storage, an accelerometer, a gyroscope, global positioning system (GPS) or other location-identifying type capability, or a display with a high degree of functionality, such as a touch-sensitive color 2D or 3D display, for example. A client device may include or may execute a variety of operating systems, including a personal computer operating system, such as a WINDOWS, IOS or LINUX, or a mobile operating system, such as IOS, ANDROID, or WINDOWS MOBILE, or the like. A client device may include or may execute a variety of possible applications, such as a client software application enabling communication with other devices, such as communicating messages, such as via email, short message service (SMS), or multimedia message service (MMS), including via a network, such as a social network, including, for example, FACEBOOK, LINKEDIN, TWITTER, FLICKR, or GOOGLE+, to provide only a few possible examples. A client device may also include or execute an application to communicate content, such as, for example, textual content, multimedia content, or the like. A client device may also include or execute an application to perform a variety of possible tasks, such as browsing, searching, playing various forms of content, including locally or remotely stored or streamed video, or games. Also, at least some of the features, capabilities, and interactions may be logged in data logs, and analyzed and monetized, as well as secured by one or more of the encryption and decryption techniques described herein.

The disclosed methods and systems may be implemented at least partially in a client-server environment, a cloud-computing environment, a peer-to-peer environment, any other type of distributed application architecture, or any combination thereof.

Figure 3:
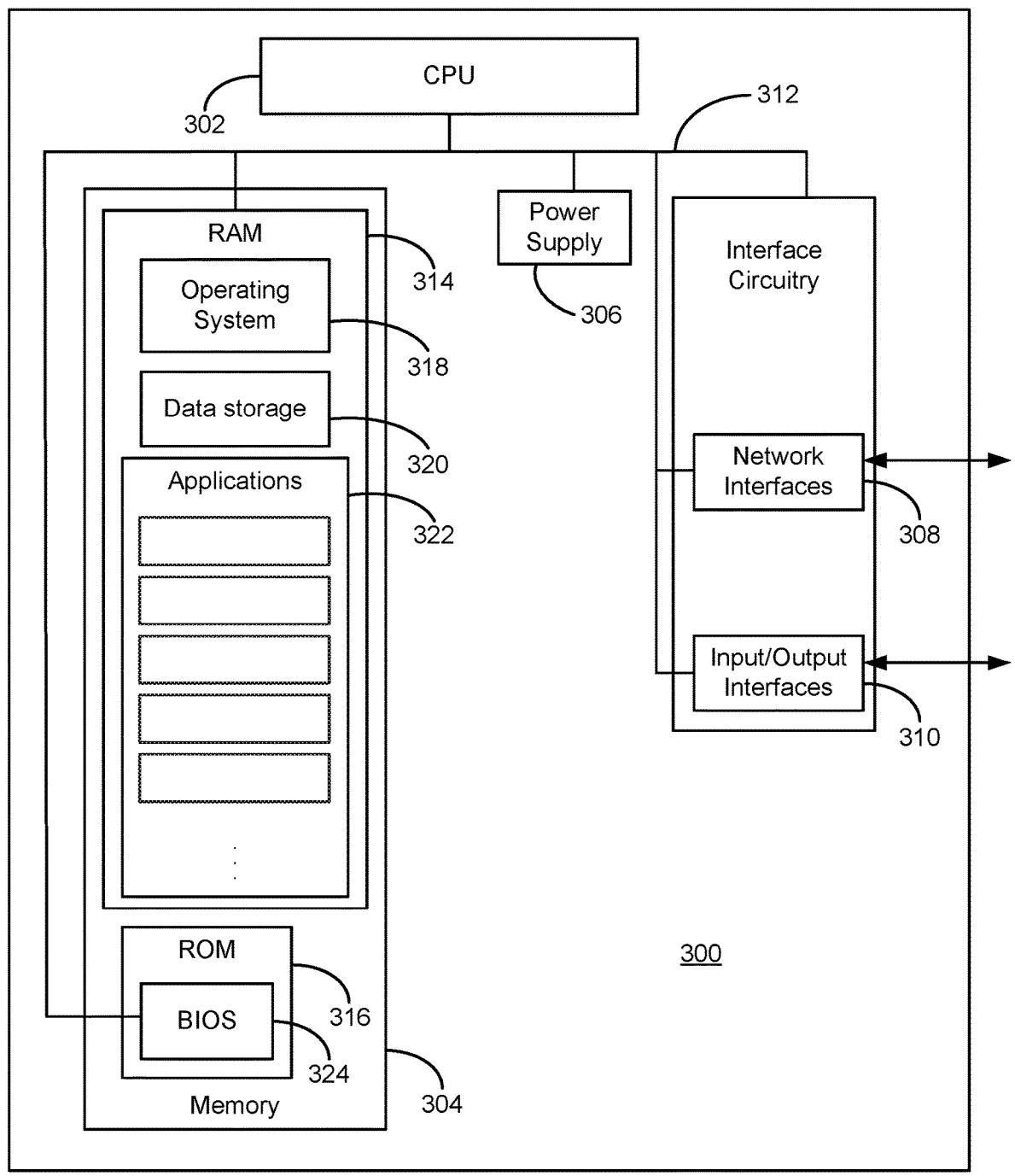
FIG. 3 illustrates a block diagram of an example device configured to use the BMA.

FIG. 3 illustrates a block diagram of an example device 300 configured to use the BMA. This illustration of the example device includes a block diagram of an example electronic device that can implement aspects of and related to example systems that can provide the behavior-based integrity measurement architecture and the security supervisor described herein. Each of the devices depicted in FIGS. 1-4, 7, and 8 may include at least part of the device 300.

The device 300 includes a central processing unit (CPU) 302, which may include multiple CPUs or data processing devices, memory 304, a power supply 306, and input/output components, such as network interfaces 308 and input/output interfaces 310, and a communication bus 312 that connects the elements of the electronic device. The network interfaces 308 can include a receiver and a transmitter (or a transceiver), and an antenna for wireless communications. The CPU 302 can include any type of data processing device as well. Also, for example, the CPU 302 can include central processing logic.

The memory 304, which can include random access memory (RAM) 314 or read-only memory (ROM) 316, can be enabled by memory devices. The RAM 314 can store data and instructions defining an operating system 318 (such as any of the operating systems described herein), data storage 320, and applications 322 (such as any applications providing services over the network 214 and any of the security services described herein based on the behavior-based integrity measurement architecture and/or the security supervisor. The applications 322 may include hardware (such as microprocessors), firmware, software, or any combination thereof. Also, the memory 304 may include a non-transitory medium including instructions corresponding to the applications 322 and/or the operating system 318. These instructions and any instructions described herein may be executable by the CPU 302 or another type of processing device. The ROM 316 can include basic input/output system (BIOS) 324 of the electronic device.

The power supply 306 contains power components, and facilitates supply and management of power to the device 300. The input/output components of the device 300 can facilitate communications between any components of the electronic device and components of external devices (such as components of other devices of the information system 200, other online server systems, and end user devices). For example, such components can include a network card that is an integration of a receiver, a transmitter, and I/O interfaces, such as input/output interfaces 310. The I/O components, such as I/O interfaces 310, can include user interfaces such as monitors, keyboards, touchscreens, microphones, and speakers. Further, some of the I/O components, such as I/O interfaces 310, and the communication bus 312 can facilitate communication between components of the electronic device, and can ease processing performed by the CPU 302.

The device 300 can send and receive signals, such as via a wired or wireless network, or may be capable of processing or storing signals, such as in memory as physical memory states, and may, therefore, operate as a server or as a client device. The device can include a server computer, dedicated rack-mounted servers, desktop computers, laptop computers, set top boxes, integrated devices combining various features, such as two or more features of the foregoing devices, or the like. Also, the device 300 may include or be one of the endpoints mentioned herein. An endpoint may include a desktop or laptop computer, a mobile device or any type of smart device (e.g., smart phone, tablet computer, smartwatch, smart TV, smart appliance), any type of computer operating a firewall, network equipment such as a router, a point of sale device or system, digital signage, an information exchange or transport system, a control system such as an industrial control system, a data acquisition system, a cloud microservice, a navigation system, and an autonomous car system, just to list a handful.

Figure 4:
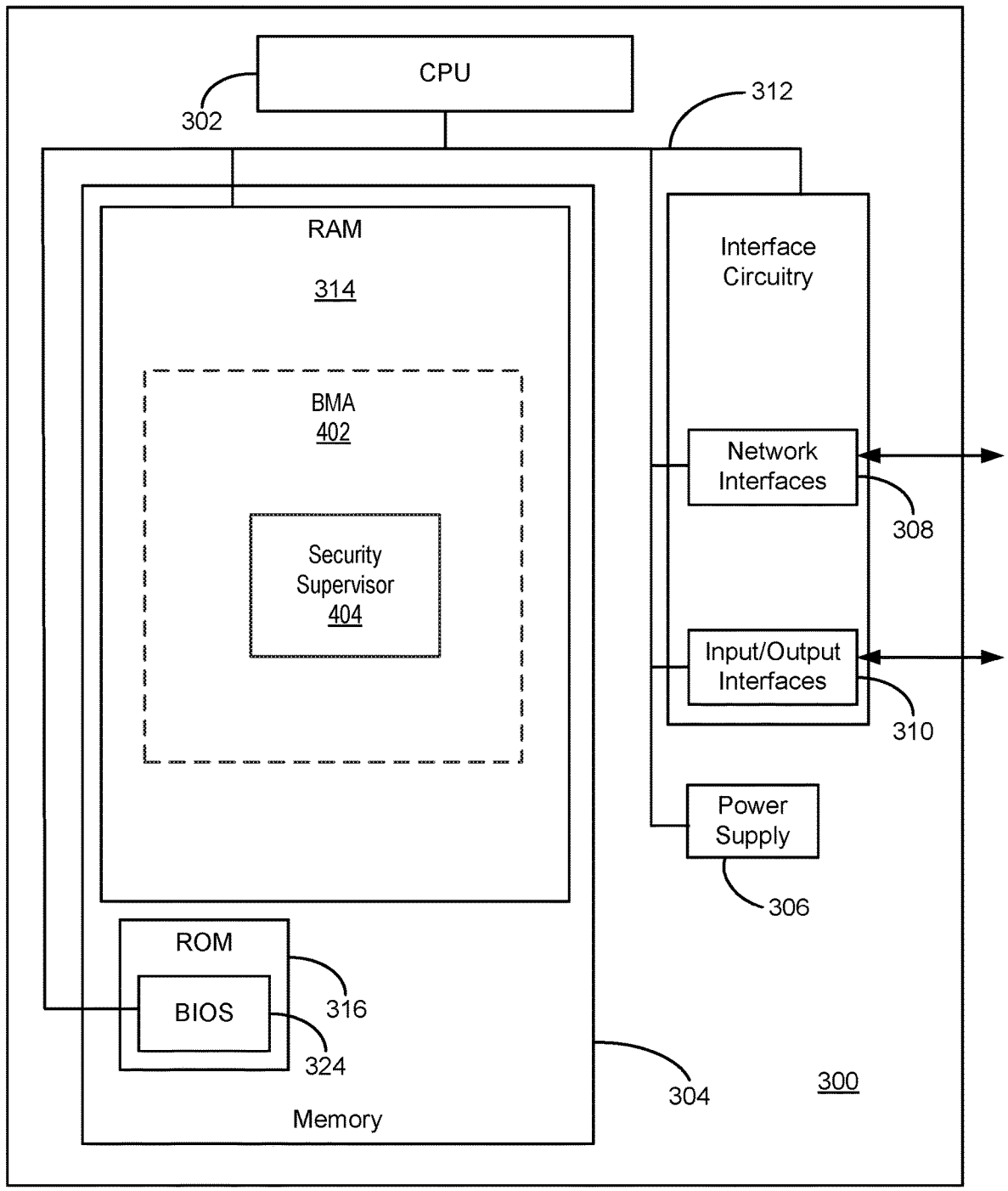
FIG. 4 illustrates a block diagram of another instance of the example device configured to use the BMA.

FIG. 4 illustrates a block diagram of another instance of the example device 300 configured to use the BMA 402. In FIG. 4, the device 300 in its RAM 314 includes BMA 402. The BMA 402 illustrated in FIG. 4 can be derived from an integrity measurement architecture and configured to use an identity model to express a deterministic measurement value for platform behavior. The device 300 in its RAM 314 can also include a security supervisor 404 derived from or associated with the BMA 402 and configured to implement a verification of behavior of service-providing network endpoints or a platform the endpoints.

In an exemplary embodiment, an operating system and/or one or more separate applications (such as the operating system 318 and/or one or more of the applications 322, respectively) can implement the behavior modeling of BMA. In such an example and others, the BMA can be built off a standard IMA architecture, such as the LINUX IMA architecture. An example difference between the known IMA and BMA is the addition of the BMA basing a measurement event on the interaction of subject/actor identities rather than a change in file content.

Figure 5:
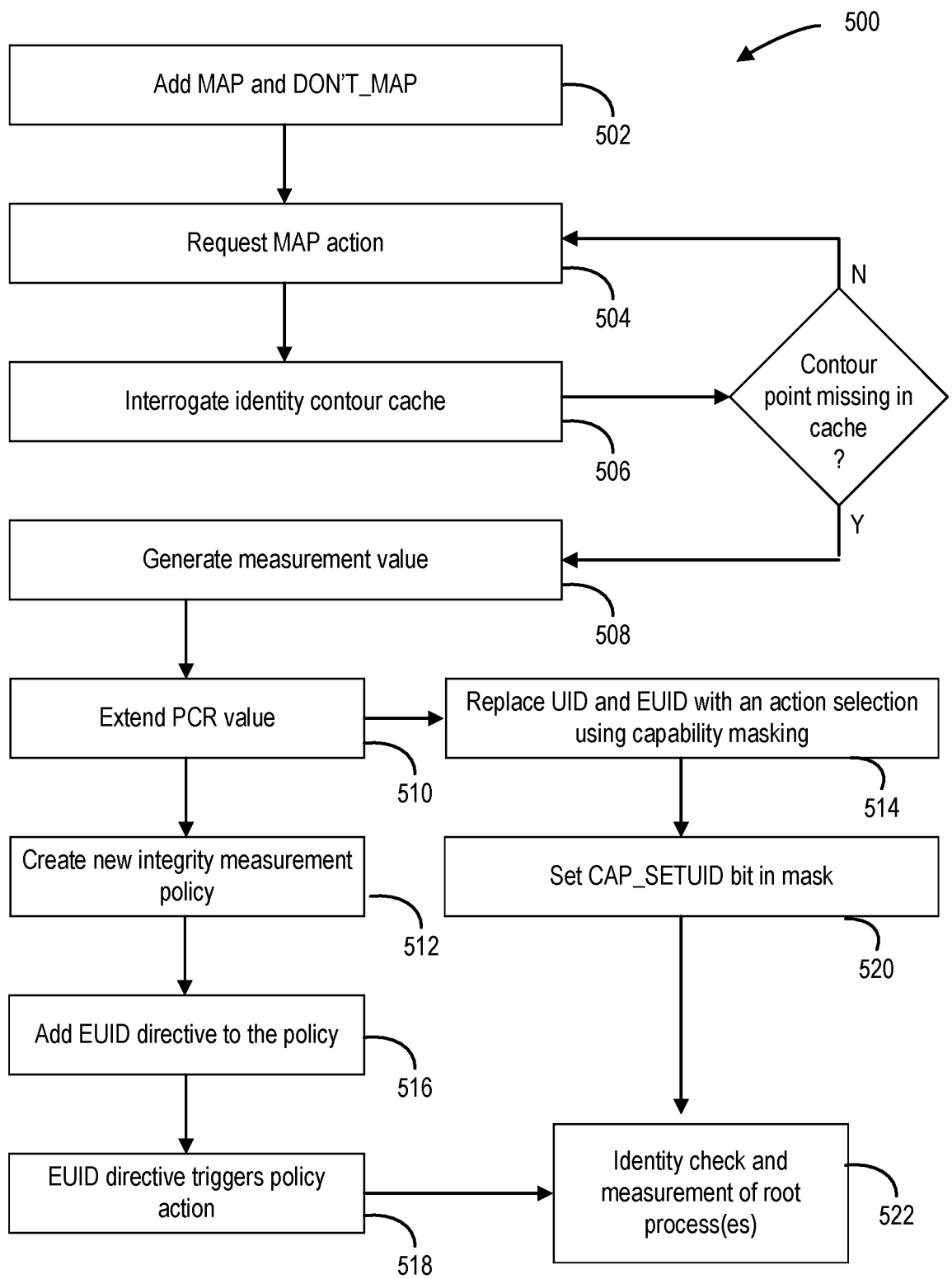
FIG. 5 illustrates example operations of an Integrity Measurement Architecture (IMA) implementation using LINUX.

FIG. 5 illustrates example operations 500 of an enhanced IMA or BMA implementation using LINUX. At 502, the MAP directive and its negation DONT_MAP can be added to the measure, appraise and audit actions and their negations. This change is based partially on the premise that the existing IMA code is based on a one measurement per inode model. In the BMA, the number of measurements per inode is based on the number of independent actor identities which operate on the inode.

In an exemplary embodiment of LINUX IMA or BMA implementation, to minimize impact on the existing code structure and to support an enhanced functionality, an identity contour cache can be implemented which is interrogated for a cache hit at 506 when a MAP action is requested at 504. If the contour point is not found in the cache, a call to the ima_store_measurement( ) function is made to generate a new measurement value 508 which is used to extend the Platform Configuration Register (PCR) based hardware measurement value 510. Since the MAP action is functionally a super-set of the MEASURE action, a new integrity measurement policy can be created which replaces the measure action with the map action 512. The new integrity measurement policy is referred to as the identity integrity policy herein.

In addition, the UID and EUID based action selectors can be replaced with an action selection by capability masking at 514. The notion of using capability masking as a condition for triggering a map or measure action is based on a regression of the original IMA implementation. The uid directive can trigger an action based on a check of the real uid of the process involved in the measurement. This can be triggered by the FILE_CHECK policy directive: measure func=FILE_CHECK mask=MAY_READ uid=0, which can result in a condition where a setuid binary run by a non-root user would not trigger a file measurement but would when run by the root user. This behavior is not preferred if the reason for triggering a file measurement is based on the assumption that a process with administrative privileges should be monitored when accessing files. Since the Discretionary Access Control (DAC) check is based on the effective identity of the process, a setuid binary run as a normal user would circumvent DAC security checks but its action in doing so would not trigger a measurement action.

To remedy the aforementioned problem with triggering the measurement action, the euid directive can be added to the IMA policy at 516 that triggers a policy action based on the effective identity of the process at 518. In addition, having the CAP_SETUID bit set in the process capability mask at 520 triggers the identity check against all three of the user identities (real, effective and saved) at 522. Since the CAP_SETUID capability allows the process to assume, with respect to DAC checks, any of the three identities, this modification triggers measurement for any root capable process at 522.

Experience with this anomaly suggested a superior method for triggering measurements would be based on the capability mask of the process rather than any specific user identity. This is consistent with the fact that permission checks throughout the LINUX kernel are based on the capability mask of a process rather than its user identity. A new 'capability=policy' directive is included that supports either the keyword 'any', which specifies a full capability mask, or a reduced capability mask specified in hexadecimal. An action is triggered if the following action mask contains any non-zero bits. The action mask can be given by: $A_{MASK}=P_{MASK}/\backslash(\text{Eff}_{MASK}\backslash/\text{Per}_{MASK})$, where $A_{MASK}$ is the action mask, $P_{MASK}$ is the policy mask, $\text{Eff}_{MASK}$ is the effective capabilities, and $\text{Per}_{MASK}$ is the permitted capabilities.

The identity integrity policy implements a mapping action based on the following FILE_MMAP and FILE_CHECK function checks.

map func=FILE_MMAP mask=MAY_EXEC capability= any map func=FILE_CHECK mask=^MAY_READ capability= any Capability masking in integrity policies can be beneficial as ambient capabilities are implemented in the LINUX kernel security architecture. Ambient capabilities are an attempt to address understood functional issues with the current capabilities model. One of the purposes of ambient capabilities is to allow increased extension of granular permissions to binaries. Also, capability based policy triggers can enable the detection of privilege violations regardless of the DAC based identities assigned to an actor process.

Figure 6:
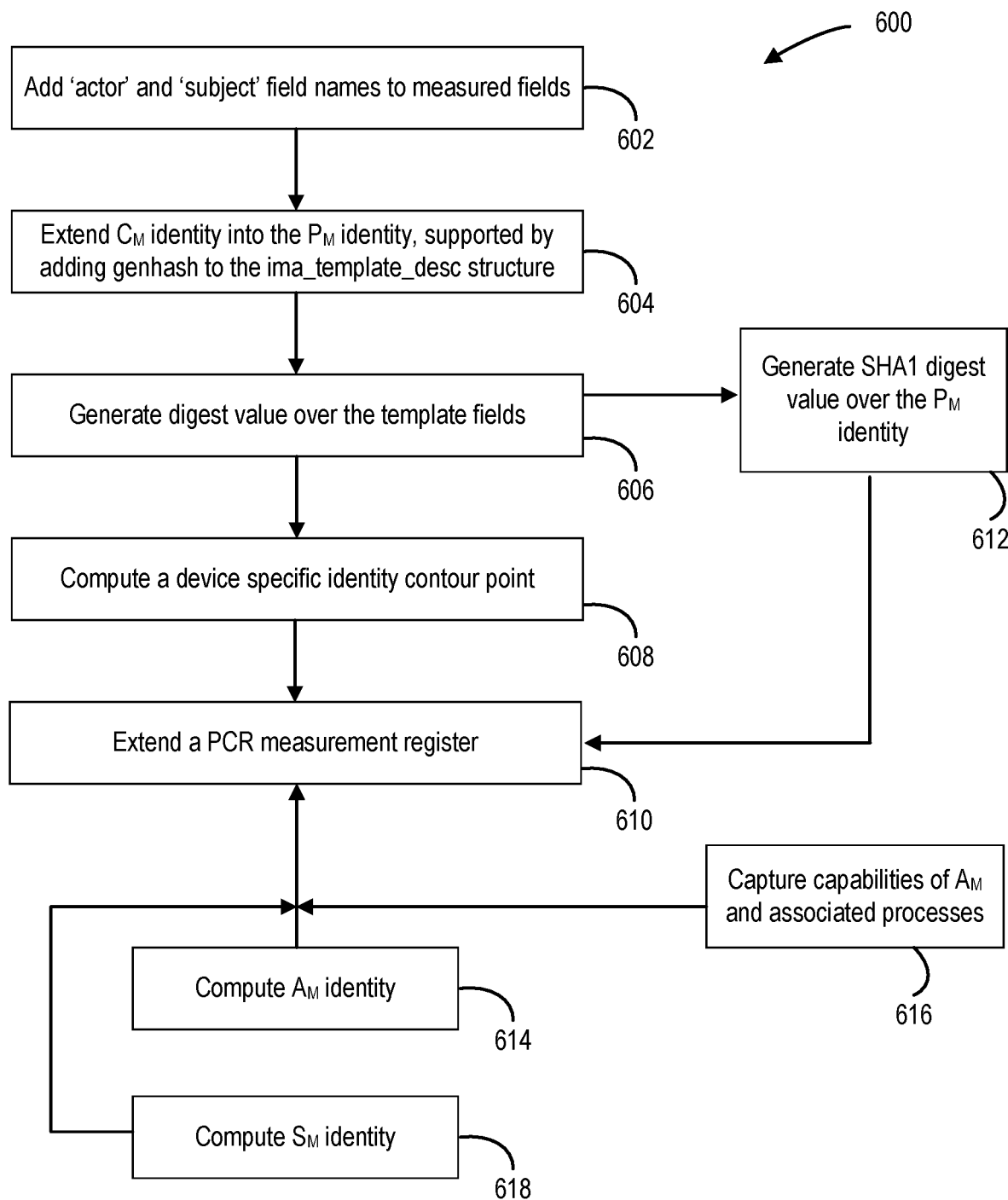
FIG. 6 illustrates additional example operations 600 of the IMA implementation using LINUX.

FIG. 6 illustrates additional example operations 600 of the IMA implementation using LINUX. An IMA based template can provide support for creation of actor and subject identities as components of the event measurement. The 'actor' and 'subject' field names can be added to the list of supported measurement fields at 602 as shown in FIG. 6. The initialization functions assigned to these fields generate the $A_M$ and $S_M$ identity projections.

To support the extension of the $C_M$ identity into the $P_M$ identity an additional member, named genhash, can be added to the ima_template_desc structure of the LINUX Kernel at 604. The ima_template_desc structure member contains a pointer to a function that is responsible for generating the digest value over the template fields at 606. The digest value can be used to extend a PCR measurement register at 610.

In an exemplary embodiment, the SHA256 hash function can be used as an identity projection function. In such an embodiment, all identities are 32 bytes in length. SHA256 can be beneficial over the SHA1 function, because the SHA1 function can be insecure even though the first pre-image resistance strength of the function is relatively secure.

In an exemplary embodiment, such as to support the POSSUM protocol, the BMA implementation maintains a kernel based 256-bit measurement register.

A measurement generation function can compute a device specific identity contour point, e.g., $P_M$, at 608, and extend the measurement register with the device specific identity contour point at 610.

For compatibility with Trusted Platform Module (TPM) hardware, a digest value consistent with the hardware implementation can be generated over the $P_M$ identity at 612 and returned to the caller to be used to extend the PCR measurement register at 610.

An 'actor' field initialization function can compute the $A_M$ identity based on the generation of a SHA256 digest over a packed structure at 614 which includes the following DAC identities: uid, euid, suid, gid, egid, sgid, fsuid and fsgid. In addition, the capabilities of the $A_M$ or associated processes are captured by including a bitmask representing the intersection of the effective and permitted capabilities masks, e.g., $\text{Eff}_{MASK} \vee \text{PerM}_{MASK}$, at 616.

A 'subject' field initialization function can compute the $S_M$ identity by computing the identity digest value over a packed structure at 618 which can include the SHA256 checksum of the file contents, uid, gid and inode number. The filename can be included via the standard filename field descriptor. The filename can be a diagnostic value. The initialization functions can be used to extend the PCR measurement register.

Figure 7:
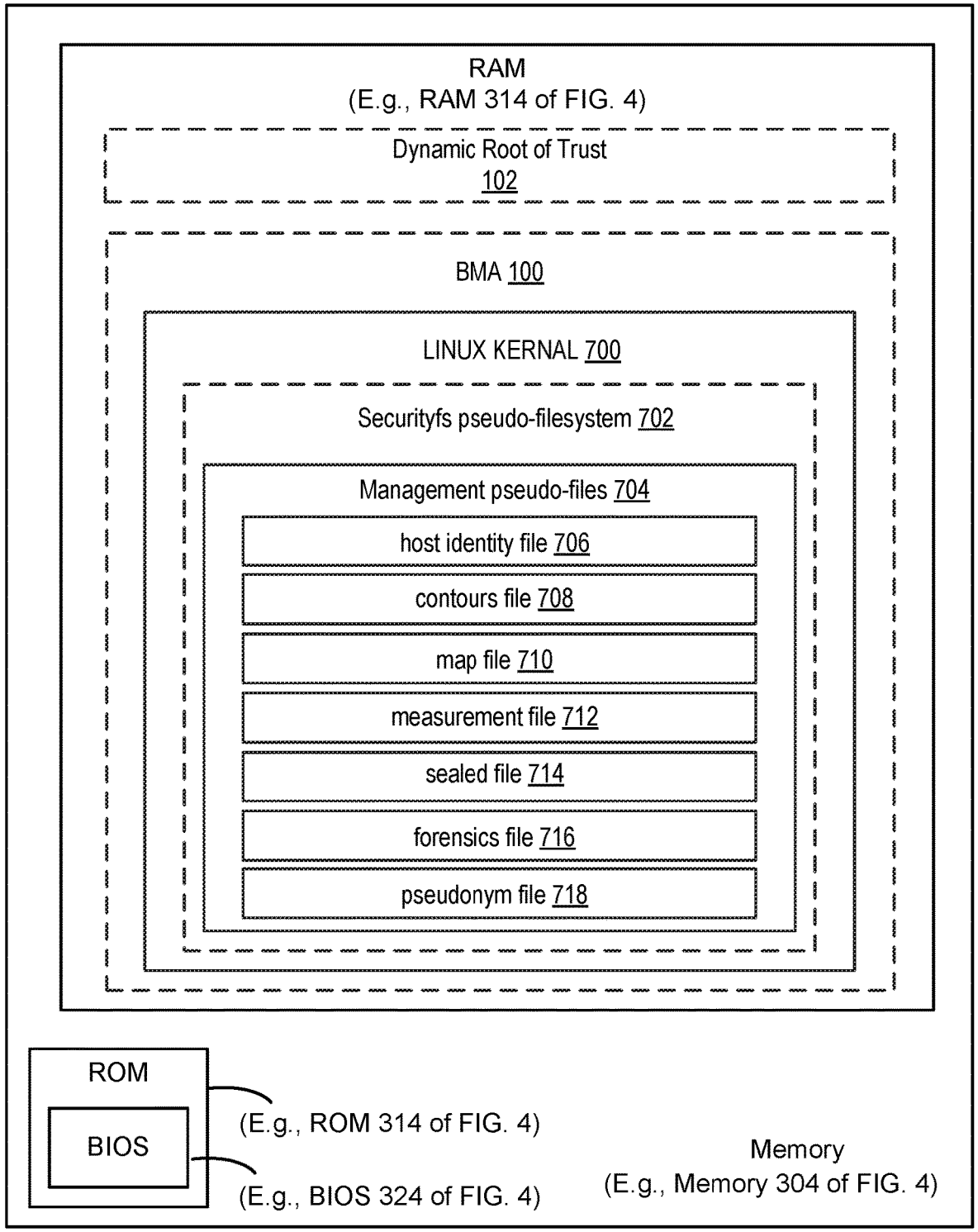
FIG. 7 illustrates a block diagram of another example device that can implement the BMA using LINUX.

FIG. 7 illustrates a block diagram of an example device that can implement the BMA 100 (shown in FIG. 1) using a LINUX kernel 702. As shown by FIG. 7, in an exemplary embodiment, management interfaces to BMA 100 are accessible via a securityfs pseudo-filesystem 702 that can be associated with or act as an example implementation of the security supervisor. Management pseudo-files 704 can be grouped in a pseudodirectory that is a part of the securityfs pseudo-filesystem 702, such as "/sys/kernel/security/ima/iso-identity". Within such a directory, at least one of the following files may implement management interfaces of the security supervisor: the host identity file 706, the contours file 708, the map file 710, the measurement file 712, the sealed file 714, the forensics file 716, and the pseudonym file 718.

The host identity file 706 may be write-only and used to set a device identity $D_M$ value which can serve as the range value for projecting the individual contour points. The device identity may be set by writing a 64-character hexadecimal value to the file. The host identify file 706 may create a device dependent host identity.

The contours file 708 may output the contents of the identity cache as a series of $C_M$ values in hexadecimal format, one value per line. The contents of this file represent the history of subject and identity interactions. Also, in an example, the contours file 708 may relate to time dependent behavior.

The map file 710 may be write-only and used to populate the BMA identity cache. The map file may be a pseudo-file. The map file accepts a series of $C_M$ values in hexadecimal format, one value per line. In addition to being added to the identity cache, the identity projections are extended with the $D_M$ identity to yield $P_M$ identities which are used to update the behavior-based identity measurement state of the platform as well as the PCR based hardware measurement value. Also, in an example, the map file 710 may support loading a platform behavior model according to the contours file being related to time dependent behavior.

The measurement file 712 may be read-only and display a measurement status of the platform and a current unitary measurement of platform behavior. This can be a 256-bit measurement value which represents the extension hash sum of the $P_M$ identities. The purpose is to provide a high-performance interface to the platform behavioral measurement. Since this measurement is not anchored in hardware it must be considered advisory unless it is validated with a hardware based reference quote.

The sealed file 714 can be write-only and used to seal the behavior-based identity measurement state of the platform. Writing a 1 to this file removes the host_identity, contours, map and pseudonym files, thus disabling any further modifications to the platform behavior model. Internally it enables a counter which limits the number of subsequent actor and identity interactions that are recorded. Once the measurement status of a platform is sealed, any subsequent $A_M$ and $S_M$ interactions are recorded and made available in the forensics file.

The forensics file 716 can provide a history of the events involved in a compromise, such as during an event of a platform compromise. The forensics file may be a read-only pseudo-file. The forensics file can provide tagged entries which document the policy event and the identity factors that were involved in generating the event. The following is an example of a forensic event in a sealed system:

function: 1
process: su
pathname: /etc/group
uid: 0
euid: 0
suid: 0
gid: 50
egid: 50
sgid: 50
fsuid: 0
fsgid: 50
capabilities: 0x1ffffffff The forensic event can be generated by a FILE_CHECK policy action by an actor process running the su binary accessing the/etc/group subject file. The actor process can run with a set of capabilities and a set of DAC identities. In this example, it is a setuid binary which has used its CAP_SETUID capability to modify its DAC access profile.

The pseudonym file 718 may be write-only and used to declare identity factor pseudonyms for subject identities. Pseudonyms can be used with BMA to address files which have variable contents or may be involved in Time of Measurement/Time of Use (TOMTOU) or open-writer violations as part of their acceptable use pattern. A pseudonym is declared for a subject by writing the pathname of the file to the pseudonym file. This causes an integrity inode cache entry to be allocated for the file. The flags entry for the inode has the IMA_PSEUDONYM and IMA_COLLECTED flags set. The ima_hash digest value for the structure is set to a value which is serially extended from the $D_M$ identity. Once defined, any $S_M$ subject identities generated from this inode use the derived digest value rather than a checksum over the file contents. This yields a constant identity value for files whose contents can be variable by the system. Any TOMTOU or open-writer violations involving inodes with the IMA_PSEUDONYM set may be disregarded. To provide support for BMA pseudonyms the security_inode_unlink function may be modified to include a call to the integrity_inode_free function. This may insure the integrity inode cache entry for a subject declared as a pseudonym is destroyed if the file is removed.

Subject pseudonyms can be configured to be declared by the security supervisor as part of the initialization of a measured platform. Once the behavior-based identity state of the platform is sealed, the pseudonym digest value cannot be restored. This can result in an off-contour projection for an interaction involving the given subject. Subject pseudonyms can be implemented to counter some IMA problems secondary to writable files. Subject pseudonyms can be configured by the security supervisor during system initialization processes. The pseudonyms can also be a synthetic file hash derived from a platform identity and can be irrevocably lost in cases of inode unlink.

The management interfaces or the securityfs interfaces are configured to simplify the design and implementation of a measured application platform. The contour points that illustrate the platform behavior measurement can either be captured at a known point in the system initialization process by reading the contents of the contours file or generated by tooling developed to support the security supervisor. A security supervisor or an equivalent entity can define the platform measurement by writing the contours into the map file followed by sealing of the platform measurement state.

In a dynamic root of trust environment, a hardware quote taken, such as during or after the sealing of the platform measurement state, provides a reference to the behavior-based identity state of the platform. The reference to the identity state can be anchored in the hardware state of the device. Any subsequent actor or subject interactions which have not been defined or whose identity factors are modified can generate a perturbation in the platform measurement which can be verified by subsequent reference quotes. The nature of the violation can be determined through the contents of the forensics file.

Security Supervisor

The security supervisor, such as the security supervisor 104, 404, or 804, includes an architecture built on or associated with the BMA. The architecture of the security supervisor can implement a measured application platform for hosting applications or execution environments with documented system behavior. The security supervisor's architecture supports the execution environments, such as a native binaries environment, a virtual machine environment, and a container environment. The security supervisor can implement a replacement for the initialization process started during booting of the computer system process. For example, in a LINUX environment init can be replaced with the security supervisor's version of init.

The security supervisor can include a native Trusted Execution Technology (TXT) environment which extends the Dynamic Root of Trust Measurement (DRTM) into the behavioral measurement state of the platform. In a virtual machine implementation, the security supervisor may run as the primary client of the system supervisor or hypervisor The security supervisor can run entirely from RAM based block devices. In an exemplary embodiment, a block device driver, such as the HugePageDisk (HPD), can implement a dynamically sizable block device. In such an implementation, the security supervisor can use the composite hardware and software behavior measurement supplied by the BMA to allow decryption and encryption of the contents of the RAM based block device.

In an exemplary embodiment, at least one of three separate block based filesystems can be used to support a security supervisor instance: root (e.g., "/"), system configuration (e.g., "/etc/system"), or platform configuration (e.g., "/etc/platform"). The contents of the "/etc/system" filesystem can be created at system provisioning time and can define the operational function the system may perform. The "/etc/platform" filesystem can be created to hold site specific configuration information and may be field configurable via 2-factor authentication technology.

The security supervisor may include an encrypted filesystem image format. Such a format may implement an Advanced Encryption Standard (AES) including an AES256-CBC (i.e., AES256 cipher block chaining) encrypted system image. Such an image may be further secured with a hash function such as HMAC-SHA256. The format can also include anti-forensic provisions for the encrypted images.

The security supervisor may include a filesystem image loader that can check for the presence of files named contours and pseudonyms in a respective directory, such as the/boot directory of a loaded filesystem. If found, the loader can write these files into corresponding file systems. For example, in a LINUX implementation, the files can be written to a virtual filesystem such as specific securityfs for the security supervisor. The filesystem images used by a security implementation are stored in the/boot directory of the boot device. In an example, each image file has a companion file with a certain suffix, such as a .seal suffix, which contains the encryption key and initialization vector for the encrypted image. The image sealing file can be symmetrically encrypted with a key which is PCR sealed to the measurement state of the platform at the time it is to be loaded.

Figure 8:
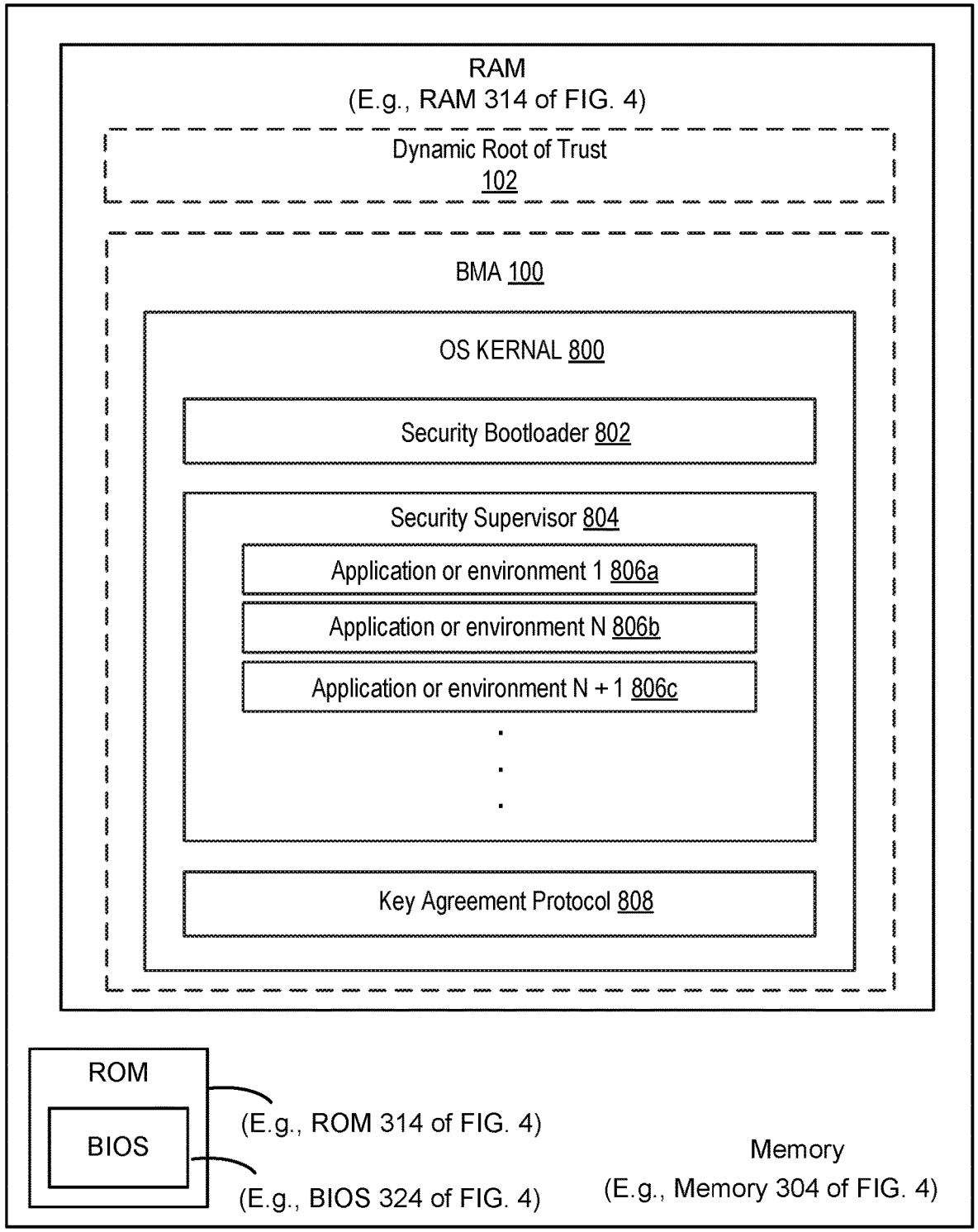
FIG. 8 illustrates a block diagram of another example device that can implement the BMA through LINUX or using a different operating system.

FIG. 8 illustrates a block diagram of another example device that can implement the BMA 100 (shown in FIG. 1) through LINUX (such as the device illustrated in FIG. 7) or using a different operating system. The device includes an operating system kernel 800 configured to initiate a launch sequence and compile the launch sequence into a kernel image that maintains the integrity of the launch sequence. The device also includes a security bootloader 802 configured to initialize a system identity and root filesystem after launch of the kernel.

The device also includes a security supervisor program 804. The security supervisor program 804 is configured to launch after launch of the security bootloader 802. The security supervisor program 804 is also configured to host applications or execution environments with documented system behavior 806a-806c. The applications or execution environments 806a-806c can include native binaries environments, virtual machine environments, or container environments.

The security supervisor program 804 is also configured to use an anonymous key agreement protocol 808 that allows at least two endpoint devices (such as any two of the devices 216-220 illustrated in FIG. 2 or device 300 illustrated in FIG. 3) to establish a shared secret over an insecure channel using a key exchange. The security supervisor program 804 is also configured to generate a unique identity for at least one of the endpoint devices based on an identity model including a hash function (such as the identity model 110 illustrated in FIG. 1). The security supervisor program 804 is also configured to generate a key for the key exchange through key scheduling based on the generated unique identity and an epoch associated with a period of time of the key exchange.

The security supervisor program 804 is also configured to verify behavior of the endpoint devices or a platform running on the endpoint devices against a respective pre-defined behavioral state for each one of the endpoint devices or the platform. The security supervisor program 804 is also configured to execute a pre-determined action if a behavior of at least one of the endpoint devices or the platform is inconsistent with the respective pre-defined behavioral state.

Figure 9:
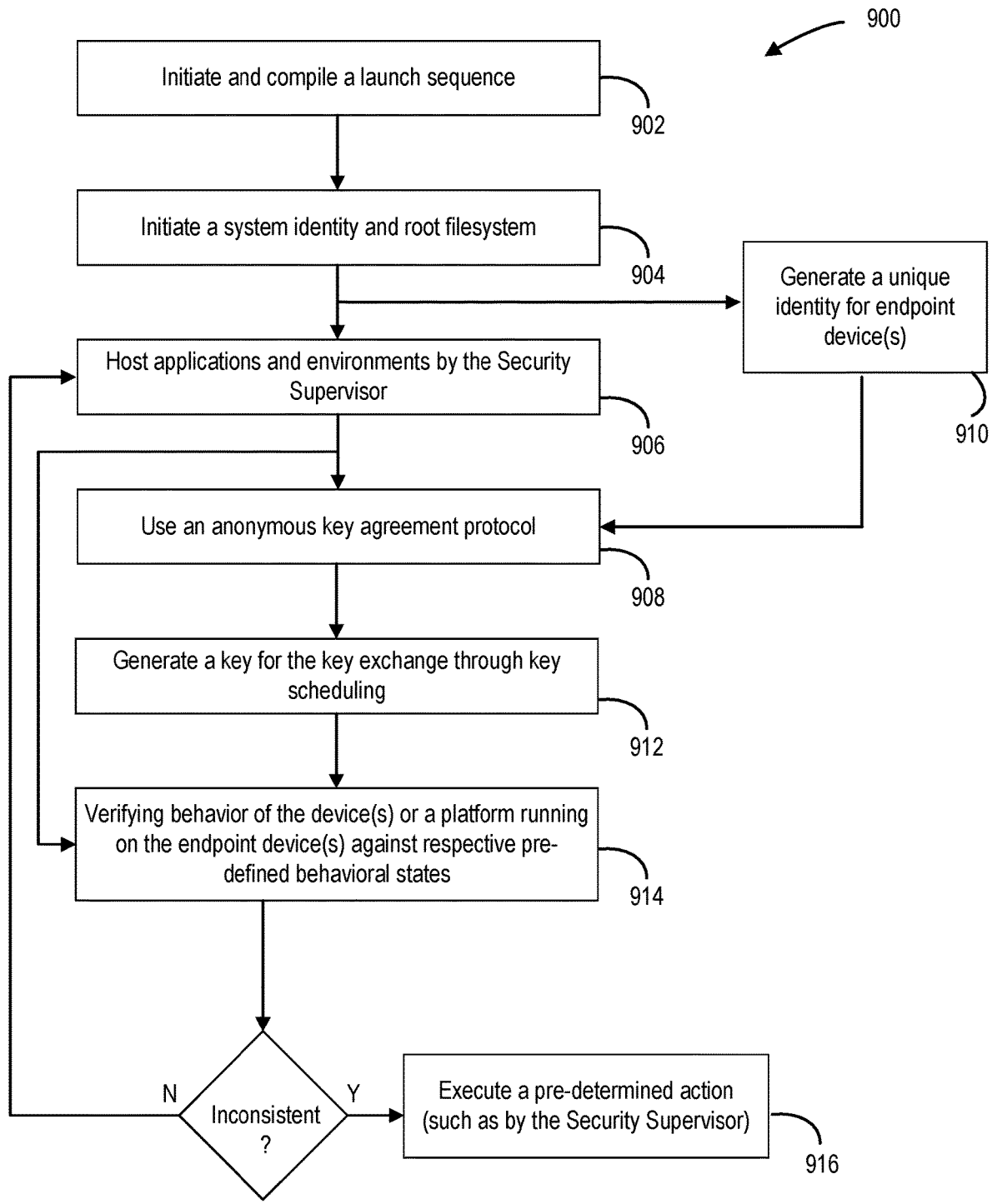
FIG. 9 illustrates additional example operations that can be implemented by one or more aspects of the BMA.

FIG. 9 illustrates additional example operations 900 that can be implemented by one or more aspects of the BMA (such as the example BMA 100). The operations 900 include initiating a launch sequence and compiling the launch sequence into a kernel image that maintains the integrity of the launch sequence at 902. The operations 900 also include initializing a system identity and root filesystem at 904.

The operations 900 also include, after compiling the launch sequence and initializing the system identity and root filesystem, hosting, by a security supervisor, applications or execution environments with documented system behavior at 906. The applications or execution environments can include a native binaries environment, a virtual machine environment, or a container environment.

The operations 900 also include, after compiling the launch sequence and initializing the system identity and root filesystem, using an anonymous key agreement protocol that allows at least two endpoint devices to establish a shared secret over an insecure channel using a key exchange at 908. The operations 900 also include generating (such as by the security supervisor) a unique identity for at least one of the endpoint devices based on an identity model including a hash function at 910. The operations 900 also include generating a key for the key exchange through key scheduling based on the generated unique identity and an epoch associated with a period of the key exchange at 912. The operations also include verifying behavior of the endpoint devices or a platform running on the endpoint devices against a respective pre-defined behavioral state for each one of the endpoint devices or the platform at 914. The operations 900 also include, at 916, after compiling the launch sequence and initializing the system identity and root filesystem, executing a pre-determined action if a behavior of at least one of the endpoint devices or the platform is inconsistent with the respective pre-defined behavioral state.

Figure 10:
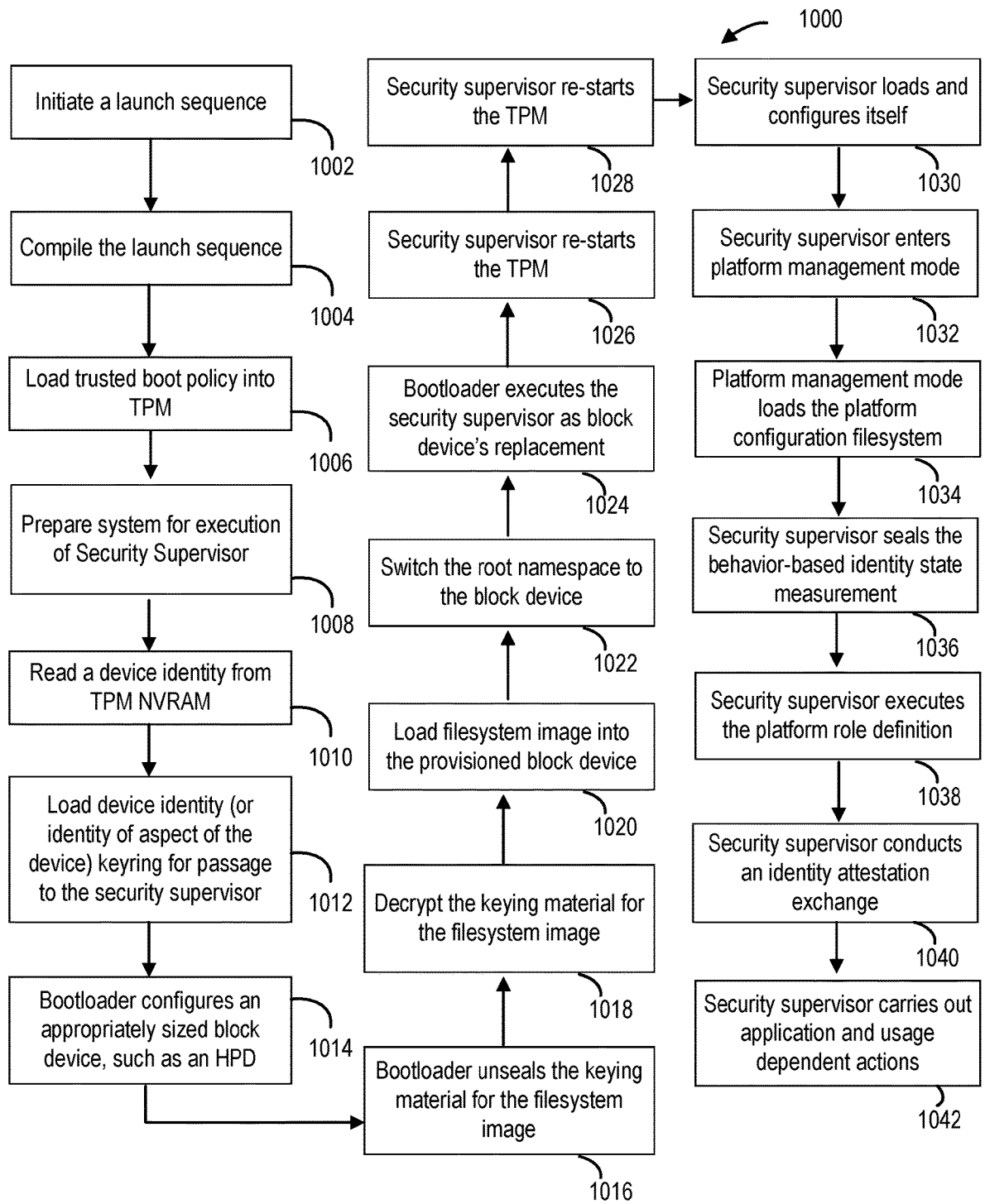
FIG. 10 illustrates additional example operations associated with the security supervisor.

FIG. 10 illustrates additional example operations 1000 associated with the security supervisor. The outline for a system launch sequence can be: kernel, security bootloader, security supervisor, and counter-party validation. The sequence can be a trusted launch sequence initiated from a kernel filesystem at 1002, such as an initramfs filesystem, and compiled into the kernel image at 1004. The integrity of the launch platform can be protected by the kernel image being covered under a trusted boot policy. The trusted boot policy may be loaded into Trusted Platform Module (TPM) non-volatile RAM (NVRAM) at 1006 during the system provisioning process. After kernel launch the system can be prepared for execution of the security supervisor's version of init (e.g., sinit) by the security bootloader at 1008. For example, the bootloader may be sboot. The loader can be responsible for initializing the system to a point where a system monitoring program, such as the tcsd TPM management daemon, can function.

Once the trusted platform resources are initialized, the security bootloader can read a device identity (such as an ASN1 encoded functional device identity) from TPM NVRAM at 1010. The device identity can be PCR read sealed to the bootloader measurement state of the platform. In an example, a reduced form of the implementation of the identity is written to a pseudofile, such as the host_identity pseudofile of LINUX, to set the device identity. The identity may be loaded into a time delimited keyring for passage to the security supervisor at 1012.

With the device identity (or an identity of an aspect of the device) loaded at 1012, the bootloader configures an appropriately sized block device, such as an HPD, at 1014, and unseals the keying material for the filesystem image at 1016. The loader decrypts the filesystem image at 1018 and loads it into the provisioned block device at 1020. When the load is completed the bootloader pauses the system and switches the root namespace to the block device 1022. The bootloader executes the security supervisor as its replacement at 1024.

The security supervisor can re-start the TPM management system at 1026. A device identity manager may be started at 1028 which transfers the device identity into restricted process memory for subsequent use. The identity manager can provide support for clients which need to prove to remote systems that they are running in a system with a specific identity.

An example client includes the POSSUM protocol. The POSSUM protocol implements a minimalistic system for implementing autonomous remote attestation between two platforms. Successfully completing a POSSUM attestation includes each platform proving that it possesses a specific identity and behavior. The result of a POSSUM attestation may be a security context which allows subsequent communications between the two platforms to be protected by providing integrity and confidentiality guarantees which are based on the current system behavior value provided by the BMA.

At 1030, the security supervisor loads and configures itself from the system configuration filesystem. It performs the system initialization based on information from the configuration filesystem at 1030 and enters platform management mode at 1032. The platform management mode loads the platform configuration filesystem at 1034. Support can be implemented in this mode for detection of a 2-factor USB authentication token to request a configuration dialogue for the system. The contents of the dialogue can be persisted by creation of a new platform configuration filesystem image.

Once the supervisor configures itself at 1030, it can enter a platform management mode based on the system and platform configuration information at 1032. The platform configuration information can accrue through the launch process. The system images in such cases can include contour and pseudonym definitions, and the system behavior measurement state can also be defined in the platform management mode. The security supervisor can seal the behavior-based identity state measurement at 1036 and begin executing the platform role definition at 1038. In the platform management mode, the supervisor may be responsible for maintaining the service providing status state of the device. Before carrying out application and usage dependent actions at 1042 the supervisor can conduct an identity attestation exchange 1040 with an appraising counter-party to verify its behavioral conformance status. For example, in platform management mode, the security supervisor may choose to create additional processes whose behavior is measured and maintained separately from that of the platform. In one implementation, this alternate measurement of behavior would create a set of pseudo-files, such as illustrated in FIG. 7, which provide the same measurement functionality for this process and any subordinate processes.

In an exemplary embodiment, the security supervisor can implement a minimalistic system for implementing autonomous mutual remote attestation between two verifying platforms. Completing such a minimalistic system protocol exchange includes that two platforms prove their current behavioral measurement is consistent with what has been designated as acceptable for the platform. Since the security supervisor is configured to deploy into environments where there may be hundreds or thousands of endpoints the behavioral status measurement is linked to the intrinsic identity of the device. This scheme provides a framework for guaranteeing no two devices have the same behavioral measurement, even if they possess identical operating systems and/or application frameworks. Violation of the integrity of any one device thus does not lead to information which would be of value in spoofing or attacking the integrity status of other devices in the service delivery framework.

The security supervisor can operate in either one-to-one or one-to-many collaboration environments. Implicit in the collaboration model is the ability to carry out device authentication and mutual platform attestation.

POSSUM Protocol

In an exemplary embodiment, the security supervisor can use POSSUM protocol. POSSUM protocol can provide a simple and easily verifiable protocol for authenticating a device and verifying its platform behavior measurement. In early embodiments, deployed field devices used Internet Protocol Security (IPsec) as a protocol suite for secure Internet Protocol (IP) communications. IPsec provides security by authenticating and encrypting each IP packet of a communication session. In embodiments, IPsec can be used as the collaboration transport layer and the POSSUM protocol can replace RACOON authentication and key negotiation system of IPsec.

In an exemplary embodiment, the POSSUM protocol can provide support for implementing an Elliptic Curve Diffie-Hellman (ECDH) key exchange between two devices, predicated on the mutual identities and platform measurement status of the devices. The ECDH exchange may be based on an elliptic curve algorithm such as Curve25519 or an alternative algorithm. The protocol is based on a packet oriented send/acknowledgement model. Packets can be encrypted with AES256-CBC and the resultant payload can be integrity protected with an HMAC-SHA256 function, such as a HMAC-SHA256 checksum. Alternate algorithms for encryption and integrity may also be used.

With POSSUM, the payload and verifier can be sent atomically as a single packet. The authentication of the POSSUM protocol exchange can be implemented through One Time Epoch Differential Key Scheduling (OTEDKS). The OTEDKS key scheduling function is based on a reduced form of the functional device identity described herein. The reduced form of the device identity implementation and the authentication element of the identity can be treated as arrays of eight separate 32-bit values. In such an example, the requested authentication time can be subtracted from each 32-bit value to yield the epoch differential vector for the identity element. The authentication differential vector is exclusively or-ed with the identity implementation vector and vice-versa to give two starting points for key scheduling. The total number of key iteration rounds can be produced by treating each 32-bit value of the identity implementation starting vector as a standard epoch date. The day of the month represented by each epoch date is summed and added to a floor value, such as 250, to determine the number of key iteration rounds.

The starting round value from the identity implementation can be hashed with HMAC-SHA256 function with the key supplied by the value derived from the identity authentication vector. The output of the hash can provide the input to the next key scheduling round. The output can be also exclusively or-ed with the HMAC key and hashed with SHA256 to serve as the HMAC key value for the next round.

In example embodiments using Cipher block chaining (CBC) encryption, the initialization vector for encryption is taken as the midpoint value in the key scheduling rounds. As mentioned herein, one of the daemons maintained by security supervisor's version of init is the identity manager. An application which uses generation of an OTEDKS key, can pass a buffer to be encrypted along with the desired authentication time to the daemon. Such a daemon can generate the keying material and encrypt the buffer. This model is configured to thwart the identity manager from being used as a key oracle in the case of a compromise of the platform.

In example embodiments using the POSSUM protocol, database driven exchanges of platform integrity status can be avoided. The POSSUM approach is a very simplistic framework which does not require any infrastructure outside the confines of two participating parties to be involved in the validation of platform behavior state. In order to simplify the logistics of this approach, identity verification files can be used. The identity verification files may have an .ivy extension and can include ASN1 encoded repositories of one or more of the following information: reduced device identity, platform public key, soft platform measurement, and hardware reference quote.

The device provisioning process can generate an identity verification file which can be used in a POSSUM protocol exchange to verify the operational state of a device. Enhanced security can use identity verification files for a device to be privileged to the devices which are using them to attest platform behavior. However, the compromise of an identity verification file does not allow the construction of a device which can spoof the behavior of the platform represented by the identity verification file, since the unreduced implementation of the identity is included to produce a specific device behavior measurement. The unreduced device identity is protected by BMA methods and procedures which have been discussed herein.

In exemplary embodiments, a device requesting authentication with a counterparty can generate an authentication packet with one or more of the following elements: replay nonce, quote nonce, and ECDH public key. The replay nonce is used to support the replay avoidance guarantee of the protocol and the quote nonce is used by the receiving party for the generation of the platform quote. Such a packet can be encrypted with the OTEDKS keying material for the requested authentication time.

Also, in such embodiments with a device requesting authentication with a counterparty, a challenge packet can be constructed with one or more of the following elements: authentication time, identity challenge, and authentication challenge. The identity challenge can be derived from the identity assertion component of the functional identity. The resulting packet can be sent to the desired communication party. In some examples, the resulting packet can be integrity protected, such as by an HMAC-SHA256 function. In such examples, a checksum key can be derived using the HMAC-SHA256 function from the OTEDKS epoch key and the value in the soft platform measurement state pseudo-file.

The receiving party can use the identity challenge to locate the identity verification file of its communication counterparty. The soft platform measurement state and authentication time can be used to carry out integrity verification and decryption of the authentication challenge. If such a process is successful, an identity challenge packet for the current device is constructed to send to the initiating party. In such examples, a ECDH key may be returned when the challenge is formed from the shared key provided by the initiating party.

The initiating party subsequent to receipt of the identity challenge from its counter-party validates the authentication challenge. If validation is successful, the ECDH derived shared key is used to encrypt a platform measurement packet containing a hardware reference quote based on the nonce supplied in the counter-party challenge.

Subsequent receipt of the platform measurement packet, the counter-party decrypts the reference quote with the ECDH session setup key. If the decryption and validation of the reference quote is successful, a platform measurement packet is generated and returned to the initiator. Subsequent validation of the counter-party platform behavior, the initiator signals completion of the circuit setup by sending a circuit rekeying request. The counter-party can reply with an ECDH key response, and the shared key from the initiator is used as the session key for any further communication.

The POSSUM protocol implementation includes the initiating party and the counter-party validating their hardware reference quotes before a final shared key is established. Since the reference quote is derived from the platform measurement, a functional guarantee is produced that the initiating party and the counter-party have verified platform behavior.

With network address translation (NAT), firewalls, and configuration of devices in DMZ network zones, an exemplary embodiment may include a non-IPsec based transport layer. One implementation may include using the POSSUM protocol extended to be a general purpose message oriented communications framework of the transport layer. The POSSUM protocol can provide a framework for a system authenticating the identity of a device and its operational behavior status.

Successful execution of a POSSUM exchange includes communications between devices with a mutually agreed upon shared secret. In IPsec-based implementations, the secret is used to derive the authentication key and initialization vectors for an ESP based tunnel. An extension of POSSUM, otherwise known as PossumPipe, can support subsequent device communications when IPsec is not a viable option. The shared secret, which can be based on ECDH, is used as an ephemeral key to authenticate and integrity verify subsequent packet exchanges.

POSSUM implements unique characteristics with respect to the exchange of secured packets. For example, each packet encryption key and initialization vector are derived from the session shared secret by hash extension summing of the secret by the unencrypted contents of the packets which have been sent. The initiating party and the counter-party each include sent and received registers with information from the packets.

Compromise of the session key (which includes the shared key) or the secret is useless in decrypting any individual packet of communications between the parties because the entire unencrypted history of the communication stream up to the packet must be available. Each transmitted frame includes a nonce of random size, which is discarded by both the sender and receiver. This measure thwarts the deduction of subsequent packet keys even if the complete contents of a communication stream is known. Another innovation of the protocol is to perturb a key, such as a HMAC-SHA256 key, used to generate the integrity checksum of a packet with the measurement state of the platform. Compromise of a platform is thus represented as an inability of a counter-party to verify the integrity of communications from an affected device. Implementation of this latter feature is the basis for generating the measurement state of a platform. Because of high packet transmission rates, it is beneficial to obtain platform measurements at a rate which would otherwise be constrained by the hardware performance of the TPM.

Some Additional Exemplary Embodiments

In some additional exemplary embodiments, the extension operators may include a non-commutative operation, based on cryptographic hash functions, used to define an acyclic path through a measurement space to a terminus such as a current system measurement. A new system measurement of a device or a platform may be defined by the following equation: $M_{new}(V) = H_M(M_{cur} \| H_N(V))$, where $H_M$ is a hash function with digest size M, $M_{cur}$ is current system measurement, and V is a is a measurement vector. For example, V can be a binary value which reflects an event which is to be integrated into the measurement state of the system.

In such an exemplary embodiment and others such as the embodiments described above, the hardware root of trust or the TPM can use a standard such as the TCG standard 1.2/2.0. The hardware root of trust or the TPM can use PCRs, asynchronous encryption primitives (such as RCA and EC), NVRAM, and various hashing functions (such as SHA1, SHA256, SHA385, and SM3). Access to the NVRAM can be tied to PCR values and a processor bus state. Attestations of platform behavior can be generated by signing the content of one or more PCRs with a private key linked to the identity of the TPM. The aforesaid features can form a measure launch environment (MLE) with safer mode extensions (SMX). The TMP NVRAM is used to bind MLE to platform hardware and boot status via the launch control and trusted boot policies.

The MLE can be derived from the security supervisor and yield M(HW/BOOT). M(HW/BOOT) is a hardware boot aggregate value measurement. It can be an extension sum over hard and firmware items such as system firmware and boot sector. The security supervisor can access an authenticated code module that then uses a launch control policy with the security supervisor to generated a trusted boot policy. The trusted boot policy then can be used to provide the MLE.

The measurement of the platform behavior can be provided by the following unitary definition of platform behavior based on actor and subject modeling: $B=M(A°S)$. This is based on the following three premises that are derived from the three premises described above. The first derived premise is the interaction of an actor and subject identity yields behavior identity. The second derived premise is that the platform behavior is the time dependent or time independent extension sum of all behavior identities. The third derived premise is that platform measurement is the extension sum of the device identity with the platform behavior. These derived premises are supported by the following unitary definition of platform behavior based on actor and subject modeling:

$$B = \sum_{i=0}^{An} \sum_{j=0}^{Sm[a]} M(H_M(A_i) \| H_M(S_j)),$$

where $A_i$ is the actor identity, $S_j$ is the subject identity, $\|$ is a concatenation, and $H_M$ is a hash function with a digest size M.

Also, the aforesaid operator is non-commutative in that $M(A_1°S_1)+M(A_2°S_1) \neq M(A_2°S_1)+M(A_1°S_1)$. It can be a time invariant model, which is N−1 degenerate and has one unique behavior with multiple unitary definitions. It can also be a time dependent model that is non-degenerate and has one unique behavior with one unitary definition. The non-degenerate model can be more complex.

In such embodiments, actor and subject identities can include hash compressions of entity specific identity characteristics. The actor can be the context of execution and can include DAC components such as uid, guid, euid, etc., MAC labels, and capability masks. The subject can include a filesystem inode or network socket. The subject can also include remote network addresses or ports, hash of file contents, DAC components, MAC labels, etc.

In some example embodiments, the Hamiltonian path of an actor identify over its subject field yields a contour. In such a model, as in others described herein, extra-dimensional compromise relates to when the platform behavior is off the contour. This is readily detectable as mentioned prior. Intra-dimensional compromise, such as when the platform behavior remains on the contour, can be resolved by the stochastic methods described herein.

The security supervisor can provide a minimalistic implementation of a platform built for attesting the behavioral from its acceptable 'behavioral orbit'. Due to the avalanche effect of the cryptographic hashes used to formulate the participating identities, an intra-dimensional compromise implies no variation could have existed in any of the dimensional factors used in the composition of an actor or subject identity.

An example of an intra-dimensional compromise would be a situation where Bob finds Mary's password on a sticky-note under Mary's keyboard. Bob uses Mary's credentials to login and access information which Mary is authorized to view but Bob is not. The system is operating within its BMA contour mappings but with its desired information disclosure behavior compromised.

An extra-dimensional compromise is a situation where an actor identity goes 'off-contour' secondary to a change in any of the dimensional factors used in the composition of the $A_M$ or $S_M$ identities. This results in a $C_M$ identity not included in the gross system behavior measurement and as such can become a detectable event. These types of compromises are thus highly amenable to detection by deterministic behavioral modeling.

Intra-dimensional compromises are poorly suited for detection by integrity measurement architectures since there appears to be no violation of system integrity, function or behavior. Detecting this type of compromise may occur through the application of behavioral prediction techniques which seek to determine if the application or system is being used in a manner inconsistent with a normal pattern of usage.

An intra-dimensional system compromise can represent the limit of detection of an integrity monitoring system. Extending integrity measurement detection limits may require increasing the dimensionality of the elements used to model system behavior. By modeling behavior based on actor and subject identity interactions, each of which are composed of multiple dimensional elements, the BMA can yield a higher level of sensitivity then systems, such as standard IMA, which models system integrity primarily on file contents.

The modeling of actor and subject interactions is similar in concept to mandatory access control models based on type enforcement systems which base access control decisions on subject and object label intersections. The $C_M$ contour points are the identities of the intersection points in a type enforcement system. Expressed in this manner, the BMA contour of an actor is the set of allowed access conditions for a subject over an object label field in a type enforcement system.

The architecture can include adding the MAC labels of an actor and subject to the set of identity factors used in the composition of the $A_M$ and $S_M$ identities. This integrates type enforcement behavior into the overall platform behavioral measurement. BMA modeling thus offers synergies to type enforcement systems by linking the defined enforcement model to a quantifiable measurement of the platforms conformance to that model.

Regardless of the identity factors used, BMA contour modeling has at its basis the notion of a white list of permitted behaviors. Specifying a BMA contour map is the equivalent of defining the set of behaviors which the system will be allowed to demonstrate and then deriving a single measurement value which reflects the sum of these desired behaviors. Any behaviors outside the bounds of the model perturbs this single measurement of platform behavioral state. The container metadata can include behavior contour map.

An important emerging issue is the notion of containerization which involves providing private implementations of system resources to a process and its subordinates. Technically the concept of containerization can be manifested in the BMA as a reduction in subject dimensionality.

While containerization is important with respect to isolation and subject dimensionality reduction, it does not address the problem of unintended actor and subject interactions or behavior. For example, a web server running in a container can still experience a security violation which could be used to subvert the behavior of the container or the application it is supporting. Given this, behavioral modeling is useful for container technology as well. The BMA can provide namespace support for the identity cache and unsharing the identity cache allows the specification of an alternate set of contour points to define the desired behavior of the actor and subject interactions in a container.

The identity model of the BMA can use TPM PCR extension to express the platform behavior in the form of a hardware measurement. A resettable PCR register can be used as the target for the measurement extensions.

The concept of a virtual TPM is understood in full virtualization models. Extending this architecture to containers may require an assessment of complexity and the notion of a 'supervisor' process for each container which is responsible for implementing the virtual TPM measurement state of the container.

Field experience with the BMA in the form of the supervisor demonstrates the utility of this approach to the practical application of securing limited service network endpoints. A LINUX based behavioral assessment system can provide an economically viable way to use commodity hardware to implement service providing endpoints which are capable of self-detecting compromise. Advances in isolation technologies, such as containerization and virtualization, provide a framework to minimize the application development costs associated with using such platforms.

Measured application platforms represent a paradigm shift in how security architectures are developed. The notion of systems self-detecting an alteration in their behavior will be critical given the effectiveness being demonstrated by current detection and prevention systems.

The BMA implements aa sensitive system for detecting variations in platform behavior. The implementation demonstrates that management interfaces can be implemented which assist in the tooling and development of integrity modeled systems. Harnessing the effectiveness of integrity modeling may benefit from integration of these systems with type enforcing mandatory access control systems. Extending the identity paradigm to other subjects, such as network socket connections, may provide a mechanism to enable the detection of anomalous behavior which may be intra-dimensional in nature given only file based subject dimensionality.

What is claimed is:

1. A method comprising:
   generating a behavioral state for an endpoint device based on actor identities and corresponding subject identities for a plurality of operations wherein for each operation, a respective actor represented by a respective actor identity performs the operation upon a respective subject represented by a respective subject identity, wherein generating the behavioral state comprises for each of the plurality of operations projecting a contour point based on the actor identity and the subject identity into a unique identity of the endpoint device and combining the projected contour points to form the behavioral state;
   recording performance of a later operation by an actor having an actor identity upon a subject having a subject identity; and
   using the actor identity and the subject identity to determine that the performance of the later operation does not match the behavioral state and indicates a security risk.

2. The method of claim 1 wherein the projected contour points are combined in a time-invariant manner.

3. The method of claim 1 wherein the actor identity is given by the following equation $A_M = H_M (FA_1 \ldots FA_N)$, where $A_M$ is the actor identity, FA is an actor identity dimension, and $H_M$ is a hash function with a digest size M.

4. The method of claim 3 wherein the subject identity is given by the following equation $S_M = H_M (FS_1 \ldots FS_N)$, where $S_M$ is the subject identity, and FS is subject identity dimensions.

5. The method of claim 4 wherein each contour point for a given actor identity operating on a subject identity is given by the following equation $C_M = H_M (A_M \| S_M)$, where $C_M$ is a contour point.

6. The method of claim 5, wherein each contour point $C_M$ is projected into the unique identity for the endpoint device through the following equation $P_M = H_M (D_M \| C_M)$, where $D_M$ is the unique identity for the endpoint device, $C_M$ is the contour point, and $\|$ is a concatenation.

7. The method of claim 6, further comprising generating the unique identity for the endpoint device according to the following equation: $D_M = H_M (R_M \| H_M (C))$, where $D_M$ is the unique identity, $R_M$ is a range value of size M, C is the credential, $\|$ is a concatenation, and $H_M$ is the hash function with digest size M.

8. The method of claim 6, wherein the endpoint device belongs to an organization provisioning devices, and the method further comprises generating the unique identity for the endpoint device according to the following equation: $D_M = H_M (O_M \| H_M (D_C))$, where $D_M$ is the unique identity, $O_M$ is an identity of an associated organization, $D_C$ is a credential of the endpoint device, $\|$ is a concatenation, and $H_M$ is the hash function with digest size M.

9. An endpoint device, comprising:
   memory; and
   a processor executing instructions to perform steps comprising:
      generating a behavior value based the identities of actors and subjects that were involved in operations performed at least in part on the endpoint device, wherein generating the behavior value comprises for each of the plurality of operations projecting a contour point based on the identity of the actor performing the operation and the identity of the subject upon which the operation is being performed into a unique identity of the endpoint device and combining the projected contour points for the plurality of operations to form the behavior value;
      receiving an identity of an actor and an identity of a subject involved in a later operation; and
      using the identity of the actor and the identity of the subject and the behavior value to determine that the later operation is suspect.

10. The endpoint device of claim 9 wherein the projected contour points are combined in a time-invariant manner.

11. The endpoint device of claim 9 wherein the identity of each actor is given by the following equation $A_M = H_M (FA_1 \ldots FA_N)$, where $A_M$ is the identity of the actor, each FA is an actor identity dimension, and $H_M$ is a hash function with a digest size M.

12. The endpoint device of claim 11 wherein the identity of each subject is given by the following equation $S_M = H_M (FS_1 \ldots FS_N)$, where $S_M$ is the identity of the subject, and each FS is a subject identity dimension.

13. The endpoint device of claim 12 wherein each contour point is given by the following equation $C_M = H_M (A_M \| S_M)$, where $C_M$ is the contour point.

14. The endpoint device of claim 13, wherein each contour point $C_M$ is projected into the unique identity for the endpoint device through the following equation $P_M = H_M (D_M \| C_M)$, where $D_M$ is the unique identity for the endpoint device, $C_M$ is the contour point, and $\|$ is a concatenation.

15. The endpoint device of claim 14, further comprising generating the unique identity for the endpoint device according to the following equation: $D_M = H_M(R_M || H_M(C))$, where $D_M$ is the unique identity, $R_M$ is a range value of size M, C is the credential, $||$ is a concatenation, and $H_M$ is the hash function with digest size M.

16. The endpoint device of claim 14, wherein the endpoint device belongs to an organization provisioning devices, and the method further comprises generating the unique identity for the endpoint device according to the following equation: $D_M = H_M(O_M || H_M(D_C))$, where $D_M$ is the unique identity, $O_M$ is an identity of an associated organization, $D_C$ is a credential of the endpoint device, $||$ is a concatenation, and $H_M$ is the hash function with digest size M.

* * * * *